United States Patent [19]
Waku et al.

[11] Patent Number: 5,902,763
[45] Date of Patent: *May 11, 1999

[54] FUSED CERAMIC COMPOSITE

[75] Inventors: Yoshiharu Waku; Narihito Nakagawa; Hideki Ohtsubo; Takumi Wakamoto, all of Ube; Kazutoshi Shimizu, Yamaguchi; Yasuhiko Kohtoku, Ube, all of Japan

[73] Assignee: Ube Industries, Inc., Ube, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/587,968

[22] Filed: Jan. 17, 1996

[30] Foreign Application Priority Data

| Jan. 19, 1995 | [JP] | Japan | 7-023286 |
| Jan. 19, 1995 | [JP] | Japan | 7-023287 |
| Jan. 19, 1995 | [JP] | Japan | 7-023288 |
| Jun. 22, 1995 | [JP] | Japan | 7-177985 |

[51] Int. Cl.[6] .................. C04B 35/117; C04B 35/50
[52] U.S. Cl. ................ 501/127; 501/152; 501/153
[58] Field of Search ...................... 501/127, 152, 501/153

[56] References Cited

U.S. PATENT DOCUMENTS

| 3,653,432 | 4/1972 | Schmid et al. . | |
| 4,316,964 | 2/1982 | Lange | 501/127 |
| 4,829,028 | 5/1989 | Seki et al. . | |
| 4,837,187 | 6/1989 | Frank et al. | 501/127 |
| 4,892,850 | 1/1990 | Hori | 501/127 |
| 4,960,738 | 10/1990 | Hori et al. | 501/127 |
| 5,028,572 | 7/1991 | Kim et al. | 501/105 |
| 5,086,020 | 2/1992 | Ishino et al. | 501/105 |
| 5,175,132 | 12/1992 | Ketcham et al. | 501/127 |
| 5,208,193 | 5/1993 | Smyth et al. | 501/127 |
| 5,278,137 | 1/1994 | Morita et al. | 505/1 |
| 5,431,704 | 7/1995 | Tamamaki et al. | 501/127 |
| 5,484,752 | 1/1996 | Waku et al. | 501/127 |
| 5,489,318 | 2/1996 | Erickson et al. | 501/127 |
| 5,508,253 | 4/1996 | Morita et al. | 505/126 |
| 5,569,547 | 10/1996 | Waku et al. | 501/127 |

FOREIGN PATENT DOCUMENTS

| 0374263 | 6/1990 | European Pat. Off. . |
| 0647601 | 4/1995 | European Pat. Off. . |
| 0585821 | 4/1993 | Japan . |
| 7149597 | 6/1995 | Japan . |
| 7187893 | 7/1995 | Japan . |

OTHER PUBLICATIONS

J. Am. Ceram. Soc., Deformation Behavior of $Al_2O_3$–$Y_3Al_5O_{12}$ Eutectic Composite in Comparison with Sapphire and YAG, by L.E. Matson, 1993, pp. 29–32.

*Primary Examiner*—Karl Group
*Attorney, Agent, or Firm*—Burgess, Ryan & Wayne

[57] ABSTRACT

A novel ceramic composite of a solidified body consisting of at least two crystal phases of oxides selected from metal oxides and complex metal oxides, except for the $Al_2O_3$/$Y_3Al_5O_{12}$ combination.

2 Claims, 11 Drawing Sheets

10μm

10μm

25μm

1μm

5 μm

25 μm

10μm

100μm

100μm

50μm

FUSED CERAMIC COMPOSITE

BACKGROUND OF THE INVENTION

1. Field of the Invention

The present invention relates to a ceramic composite which has a high mechanical strength, and an excellent creep resistance in a wide temperature range from room temperature to a high temperature and is suitable for use as a structural material at a high temperature.

2. Description of the Related Art

SiC and $Si_3N_4$ have been investigated to develop ceramic materials to be used at high temperatures but they are not sufficient in high temperature properties. As an alternative material thereof, SiC/SiC composite materials produced by chemical vapor impregnation, provided by Societe Europeene de Propulsion, have attracted attention, and at the present are considered to be the best high temperature structural materials that have have been investigated and developed. The temperature range at which they can be used is reported to be 1400° C. or lower.

Manufacture of ceramics is primarily done by a powder sintering method in which improvement in powder characteristics, such as finer particle size and higher purity, have made it possible to obtain $ZrO_2$ ceramics having the high strength, at room temperature, of 30 GPa. It is also possible to produce a composite material in which additional ceramic particles are dispersed at the level of nano meters in a sintered ceramic material, by which an improvement in the strength, toughness and thermal properties of the ceramic material was provided.

It was generally considered that oxide ceramics cannot be used for high temperature structural materials which receive high loads, since oxide ceramics are easily deformed at high temperatures. The oxide ceramics are better in resistance to oxidation and corrosion at high temperatures than other types of ceramics and therefore can be expected to be used in a wide range of uses if the mechanical strength at high temperature can be enhanced. In this respect, metal oxides such as $Al_2O_3$, $ZrO_2$ and MgO and rare earth element oxides such as $Y_2O_3$, $La_2O_3$, $Yb_2O_3$, $Sm_2O_3$, $Gd_2O_3$, $Nd_2O_3$ and $Er_2O_3$, having melting points higher than 2000° C., are expected to be useful for high temperature ceramics.

Japanese Unexamined Patent Publication (Kokai) No. 5-85821 discloses a sintered body comprising a rare earth element oxide (an oxide of a rare earth element or an oxide of two or more rare earth elements) and $Al_2O_3$ and a process for producing the same. A rare earth element oxide and $Al_2O_3$ are mixed and formed into a shape, followed by sintering the shape at an optimum sintering temperature for an optimum sintering time period so as to control the crystal grain size of the sintered body to 30 µm or less, by which extraordinal grain growth and the appearance of pores are prevented and a rare earth element oxide-alumina sintered body with a high strength, high toughness and high reliability can be provided.

Mr. T. Parthasarathy et al. in Journal of the American Ceramics Society Vol. 76, No. 1, pp29–32 (1993) disclosed a composite of alumina and yttrium aluminum garnet (sometime hereinafter referred to as "YAG") of eutectic $Al_2O_3$—$Y_3Al_5O_{12}$.

Mr. Parthasarathy et al. also disclose a method of producing the composite by unidirectionally melting and solidifying a mixed powder of $Al_2O_3$ and $Y_2O_3$ in a crucible.

It is comprehensible from the description on page 29, right column, lines 9 and 10 and FIGS. 1 and 2 of the literature that the composite is polycrystalline and includes grain boundaries. This is clearly supported from the description "The failure was usually along the colony boundaries with crack running along the $Al_2O_3$-YAG interface boundaries". These colony boundaries are shown as portions where the microstructure is larger than in the other portions in FIG. 2 of the literature.

This composite material has stresses equivalent to those of sapphire at 1530° C. and 1650° C. when the strain rate was made constant.

Moreover, the present inventors confirmed by experiment that the composite disclosed by Mr. Parthasarathy et al. include pores or voids in the microstructure and the mechanical strength of the composite falls rapidly at high temperature.

It is clear, as evidenced by the above that the mechanical properties of ceramic composite materials at high temperatures largely depend on the structure of grain boundaries of constituent materials, the interface between the matrix and the reinforcing phase, and crystallographic properties of reinforcing phase and matrix and precise control of these factors are required.

The present inventors, considering the above problems of the conventional art, have vigorously investigated to obtain ceramic composite materials having excellent mechanical strength and creep resistance from room temperature to a high temperature, particularly having remarkably improved properties at high temperatures.

As results, the inventors found novel ceramic composite materials consisting of α-$Al_2O_3$ and YAG, constituting single crystal/single crystal phases, single crystal/polycrystal phases, and polycrystal/polycrystal phases (see Japanese Unexamined Patent Publication (Kokai) Nos. 07-149,597 and 07-187893 and Japanese Patent Application No. 06-240790).

SUMMARY OF THE INVENTION

The object of the present invention is to provide, following the above ceramic composite materials consisting of α-$Al_2O_3$ and YAG phases, novel ceramic composites of solidified bodies consisting of at least two crystal phases of oxides selected from metal oxides and complex metal oxides, i.e., metal oxide/metal oxide, metal oxide/complex metal oxide, or complex metal oxide/complex metal oxide, which have excellent mechanical properties and creep resistances at from room temperature to a high temperature and particularly, remarkably enhanced properties at high temperatures.

Thus, in accordance with the present invention, there is provided a ceramic composite of a solidified body consisting of at least two crystal phases of oxides selected from the group consisting of metal oxides and complex metal oxides, except that said at least two oxides are not the combination of aluminum oxide ($Al_2O_3$) and a complex oxide (YAG) of aluminum oxide ($Al_2O_3$) and yttrium oxide ($Y_2O_3$).

Exemplified metal oxides include $Al_2O_3$, MgO, $SiO_2$, $TiO_2$, $ZrO_2$, CaO, BaO, BeO, FeO, $Fe_2O_3$, MnO, CoO, $Nb_2O_3$, $Ta_2O_3$, $Cr_2O_3$, SrO, ZnO, NiO, $Li_2O_3$, $Ga_2O_3$, $HfO_2$, $ThO_2$, $UO_2$ and $SnO_2$.

Exemplified rare earth element oxides include $La_2O_3$, $Y_2O_3$, $CeO_2$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$ and $Lu_2O_3$.

A complex metal oxide, also called as compound oxide or sometimes double oxide, means an oxide of two or more metal elements.

Exemplified complex metal oxides include $3Al_2O_3 \cdot 2SiO_2$, $MgO \cdot Al_2O_3$, $Al_2O_3 \cdot TiO_2$, $BaO \cdot Al_2O_3$, $BaO \cdot 6Al_2O_3$, $BeO \cdot Al_2O_3$, $BeO \cdot 3Al_2O_3$, $3BeO \cdot Al_2O_3$, $CaO \cdot TiO_2$, $CaO \cdot Nb_2O_3$, $CaO \cdot ZrO_2$, $2CoO \cdot TiO_2$, $FeAlO_4$, $MnAlO_4$, $2MgO \cdot Y_2O_3$, $2MgO \cdot SiO_2$, $MgCr_2O_4$, $MgO \cdot TiO_2$, $MgO \cdot Ta_2O_5$, $MnO \cdot TiO_2$, $2MnO \cdot TiO_2$, $3SrO \cdot Al_2O_3$, $SrO \cdot Al_2O_3$, $SrO \cdot 2Al_2O_3$, $SrO \cdot 6Al_2O_3$, $SrO \cdot TiO_3$, $3Y_2O_3 \cdot 5Al_2O_3$, $2Y_2O_3 \cdot Al_2O_3$, $2MgO \cdot Al_2O_3 \cdot SiO_2$, $LaAlO_3$, $CeAlO_3$, $PrAlO_3$, $NdAlO_3$, $SmAlO_3$, $EnAlO_3$, $GdAlO_3$, $DyAlO_3$, $Yb_4Al_2O_9$ and $Er_3Al_5O_{12}$.

Exemplified complex metal oxides of $Al_2O_3$ and rare earth element or metal include $11Al_2O_3 \cdot La_2O_3$, $11Al_2O_3 \cdot Nd_2O_3$, $11Al_2O_3 \cdot Pr_2O_3$, $EuAl_{11}O_{18}$, $2Gd_2O_3 \cdot Al_2O_3$, $Sm_2O_3 \cdot 11Al_2O_3$, $Yb_3Al_5O_{12}$, $CeAlO_3$, $CeAl_{11}O_{18}$, $Er_3Al_5O_{12}$ and $Er_{14}Al_2O_9$.

The oxide of each crystal phase may be any of a single oxide such as $Al_2O_3$, a complex oxide such as $MgO \cdot Al_2O_3$, or a solid solution oxide. The solid solution oxide means an oxide consisting of a primary oxide to which an additional oxide is solid solved.

The term "solidified body" means that the body is obtained by molting the powders or materials of at least two oxides followed by cooling the molten material to allow solidification "solidified" is sometimes also called "melted" or "fused" as, for example, in "melted alumina" or "fused alumina". The solidified body is clearly distinguished from a sintered body.

The ceramic composite of the present invention can have a uniform structure which does not include colonies and voids by controlling the conditions of manufacture. The ceramic composite of the present invention does not include any of the grain boundary phases which are generally present in sintered ceramic bodies and are constituted by a material having a composition different from each of the compositions of the crystal grains, for example, a sintering agent or a reaction product or mixture thereof.

It is also possible to produce a ceramic composite constituted by a combination of the crystal phases of single crystal/single crystal, single crystal/polycrystal, or polycrystal/polycrystal of a combination of metal oxide-metal oxide, metal oxide-complex metal oxide, or complex metal oxide-complex metal oxide, by controlling the conditions of manufacture.

The single crystal means that only a diffraction peak derived from a specific crystal plane is observed in an X-ray diffraction of a ceramic composite. This means that the ceramic composite includes only one single crystal or a plurality of single crystals which are aligned in the same crystallographic orientation, most typically a three dimensionally continuous single crystal.

Further, each phase of the single crystal and polycrystal phases can have a three dimensionally continuous structure and these three dimensionally continuous phases are typically intertmingled with each other.

Alternatively, in the ceramic composite of the invention, the only polycrystal phase may be a three dimentionally continuous phase in which a plurality of single crystals may be dispersed in the form of fibers or particles.

It is also possible to add an additional oxide to the constituent oxides to be dissolved or precipitated in at least one of the constituent oxides of the ceramic composite or to present at boundaries of the phases, by which the mechanical or thermal properties of the ceramic composite is varied.

The sizes of phases may be controlled by selecting the solidification conditions but is typically 1 to 50 $\mu$m. Here, the size of a phase means a dimension of the phase which is observed in a section of a ceramic composite. Most typically, the sectional view takes a sea-island structure (e.g. FIG. 1).

For example, in the case of a combination of $Al_2O_3$ and $SiO_2$ of the Examples, i.e. a ceramic composite consisting of an $Al_2O_3$ phase and a $3Al_2O_3 \cdot 2SiO_2$ phase, a complex oxide made of $Al_2O_3$ and $SiO_2$ can be obtained, since they form an eutectic crystal consisting of 68 mol % of $Al_2O_3$ and 32 mol % of $SiO_2$. In the ceramic composite of the present invention, the proportion between $Al_2O_3$ and the complex oxide $3Al_2O_3 \cdot 2SiO_2$ can be varied in a range of about 20 to 80% by volume of $Al_2O_3$ and about 80 to 20% by volume of $3Al_2O_3 \cdot 2SiO_2$ by varying the ratio between the starting $Al_2O_3$ and $SiO$, powders.

Also, in a combination of $Al_2O_3$ and $Gd_2O_3$ of Examples, which form an eutectic crystal $GdAlO_3$ consisting of 78 mol % of $Al_2O_3$ and 22 mol % of $Gd_2O_3$, a ceramic composite consisting of an $Al_2O_3$ phase and a $GdAlO_3$ phase having a perovskite structure of a complex oxide made of $Al_2O_3$ and $Gd_2O_3$ can be obtained. This ceramic composite may have a composition in a range of about 20 to 80% by volume of $\alpha$-$Al_2O_3$ and about 80 to 20% by volume of $GdAl_2O_3$.

The oxides having a perovskite structure which can be present in accordance with the present invention include $LaAlO_3$, $CeAlO_3$, $PrAlO_3$, $NdAlO_3$, $SmAlO_3$, $EuAlO_3$ and $DyAlO_3$.

A ceramic composite comprising at least one oxide having a perovskite structure can have a finer structure and, as a result, an enhanced mechanical strength.

In a case of a combination of $Al_2O_3$ and $Er_2O_3$, which form an eutectic crystal of 81.1 mol % of $Al_2O_3$ and 18.9 mol % of $Er_2O_3$, a ceramic composite consisting of an $Al_2O_3$ phase and an $Er_3Al_5O_{12}$ phase having a garnet structure of a complex oxide made of $Al_2O_3$ and $Er_2O_3$ can be obtained. The ceramic composite may comprises about 20 to 80% by volume of $\alpha$-$Al_2O_3$ and about 80 to 20% by volume of $Er_3Al_5O_{12}$.

The oxides having a garnet structure which can be present in accordance with the present invention include $Yb_3Al_5O_{12}$, etc.

A ceramic composite comprising at least one oxide having a garnet structure can have an improved creep resistance.

The ceramic composite of the present invention can be produced, for example, by the following process.

A mixed powder of at least two oxide ceramic powders in a ratio for a desired ceramic composite is prepared by weighing and mixing. The mixing method is not particularly limited and may be either of a dry mixing method or a wet mixing method. In a wet mixing method, an alcohol such as methanol or ethanol is generally used as the medium.

The mixed powder is then heated to a temperature at which both starting powders are molten, for example, at 1950 to 2100° C. in the case of $Al_2O_3$ and $SiO_2$, in a conventional furnace, for example, an arc furnace, to melt the mixed powder.

Subsequently, the melt is charged in a crucible and then unidirectionally solidified to prepare a ceramic composite of the present invention. Alternatively, the melt is once solidified and crushed and the crushed material is then charged in a crucible and melted and unidirectionally solidified. Further, the above melt is cast in a crucible heated to a predetermined temperature which is then cooled while controlling the cooling rate to obtain a solidified body.

The atmospheric pressure during the melting and solidification is generally 300 Torr or less, preferably $10^{-3}$ Torr or less. The speed of moving the crucible for unidirectional solidification, i.e., the rate of growth of the ceramic composite material is generally 500 mm/hour or less, preferably 1 to 100 mm/hour. The control of the conditions other than the atmospheric pressure and crucible moving speed can be done in the same manner as in conventional methods.

If the atmospheric pressure or the crucible moving speed during the melting and solidification is outside the above ranges, pores or voids tend to appear, and it is difficult to obtain a ceramic composite excellent in mechanical strength and creep behavior.

The apparatus for unidirectional solidification may be a conventional one in which a crucible is vertically movably mounted in a vertically arranged cylindrical container, an induction heating coil is disposed around the approximate center position of the cylindrical container, and a vacuum pump is provided to evacuate the container space.

The ceramic composites of the present invention are remarkably improved in their heat resistance, durability, strength, thermal stability and the like at high temperatures, exhibiting excellent characteristics at a high temperature above 1500° C. in air, and therefore they are highly useful as members such as turbine blades of jet engines, electric power generator turbine, and the like as well as jigs for measuring high temperature properties.

In addition, they are highly useful in the wide variety of fields where oxide-based ceramics such as $Al_2O_3$ are used in practice, for example, in a heat exchanger for a high temperature furnace, as materials for a neclear fusion furnace, as materials for a nuclear furnace, as abrasion resistance materials, and as corrosion resistance materials.

Moreover, if the ceramic composites are made into the form of fibers or powders, they can be suitably used as reinforcing members dispersed in ceramic composite materials or nickel-based super alloys or cobalt-based super alloys which are used in the turbine blades of power generation turbines or in jet engines. Further, the obtained powders may be melted and solidified on the surface of a metal member or others by a method such as plasma spraying, which is expected to improve the oxidation resistance and the abrasion resistance.

Formation of the ceramic composite in the form of fibers may be conducted, for example, by changing a solidified body obtained by unidirectional solidification into a wire having a diameter of about 1 mm, dipping an end of the thus obtained wire into a pool of a melted material having the same composition as that of the wire, and drawing the wire to grow a crystal in the form of a fiber.

Alternatively, the Edge-defined Film-fed Growth method in which a guide is placed in a melt pool to cause capillary action and the guide is drawn, and the Laser Heated Float Zone (LHF) method in which a rod previously prepared by sintering is irradiated with a beam such as a laser beam to zone melting and unidirectional solidification, may be adopted.

Formation of the ceramic composite in the form of powder may be conducted by a method in which a melted material is dropped through fine pores formed at the bottom of a crucible into a furnace having a graduation of temperature so as to solidify the same.

The surface coating may be conducted by immersing a member to be coated into a melt pool, unidirectionally solidifying the melt while immersing the member therein, and removing the crucible which held the melt by post-machining or processing.

EXAMPLES

Example 1

$\alpha$-$Al_2O_3$ powder and $Gd_2O_3$ powder in a molar ratio of 78.0% by mole of the former to 22.0% by mole of the latter were milled in a wet ball mill using ethanol. The obtained slurry was dried in a rotary evaporator to remove the ethanol.

The obtained mixed powder of $\alpha$-$Al_2O_3$ and $Gd_2O_3$ was charged in a molybdenum crucible in a chamber, in which the atmospheric pressure was maintained at $10^{-5}$ Torr and the crucible was heated by an induction coil to 1850 to 2000° C. to melt the mixed powder in the crucible. Subsequently, unidirectional solidification was conducted by lowering the crucible, at a speed of 5 mm/hour and under the above atmospheric pressure, to obtain a unidirectionally solidified body.

Figure 1:
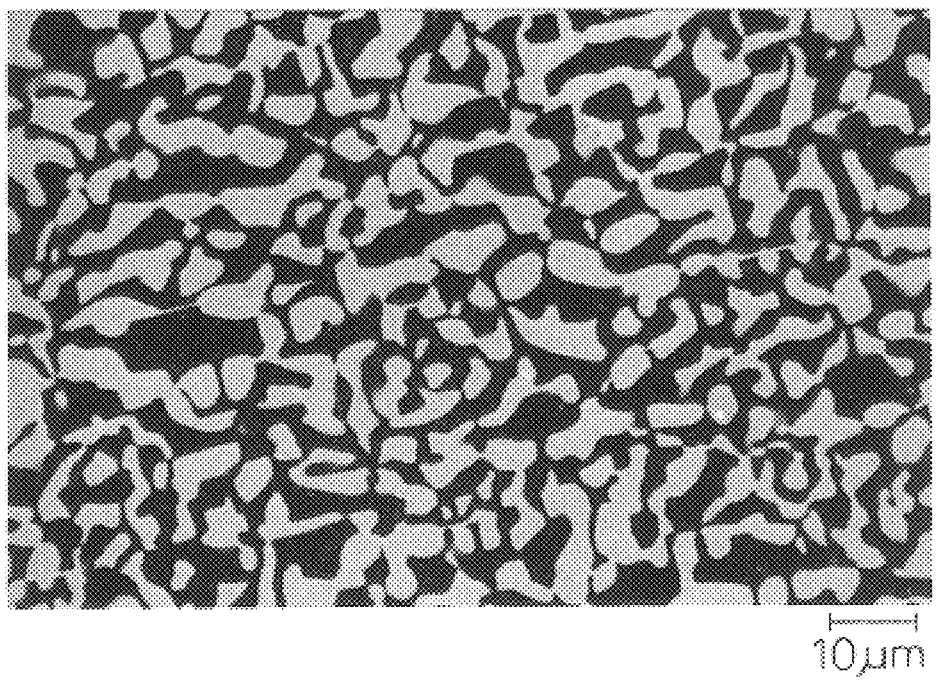
FIG. 1 is a scanning electron microphotograph showing a ceramic composite obtained in Example 1.

FIG. 1 shows scanning electron micrograph of the thus obtained solidified body in a section cut perpendicular to the direction of the solidification. In the photograph, the white portions are a $GdAlO_3$ phase and the black portions are an $\alpha$-$Al_2O_3$ phase.

It was demonstrated that the ceramic composite of the solidified body does not include any colony or grain boundary phase, that pores or voids do not exist, and that a uniform structure is obtained.

Further, in X-ray diffraction patterns of the ceramic composite obtained from the plane perpendicular to the direction of the solidification, only a diffraction peak from a specific plane of $\alpha$-$Al_2O_3$ and a diffraction peak from a specific plane of $GdAlO_3$ were observed, demonstrating that the solidified body was a ceramic composite consisting of an $\alpha$-$Al_2O_3$ single crystal phase and a $GdAlO_3$ single crystal phase.

The mechanical strength of the ceramic composite is shown in Table 1, where the three point bending strength was measured in air. The ceramic composite was kept at 1750° C. for 50 hours and the increase in weight was 0.003 g/cm$^3$.

TABLE 1

|  | Example 1 | Example 2 |
| --- | --- | --- |
| Three point bending strength (MPa) | 600 | 1000 |

Example 2

$\alpha$-Al$_2$O$_3$ powder and Gd$_2$O$_3$ powder in a molar ratio of 78.0% by mole of the former to 22.0% by mole of the latter were milled in a wet mill using ethanol. The obtained slurry was dried in a rotary evaporator to remove the ethanol.

The obtained mixed powder of $\alpha$-Al$_2$O$_3$ and Gd$_2$O$_3$ was charged in a molybdenum crucible in a chamber, in which the atmospheric pressure was maintained at 10$^{-5}$ Torr and the crucible was heated by an induction coil to 1850 to 2000° C. to melt the mixed powder in the crucible. Subsequently, unidirectional solidification was conducted by lowering the crucible, at a speed of 20 mm/hour and under the above atmospheric pressure, to obtain a unidirectionally solidified body.

Figure 2:
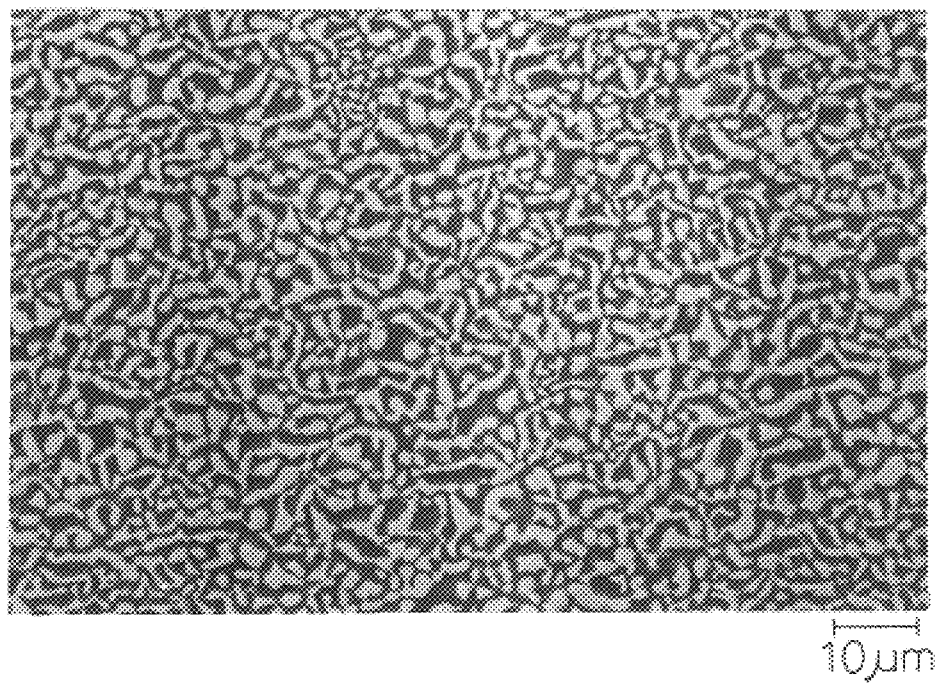
FIG. 2 is a scanning electron microphotograph showing a ceramic composite obtained in Example 2.

FIG. 2 shows scanning electron micrograph of the thus obtained solidified body in a section cut perpendicular to the direction of the solidification. In the photograph, the white portions are a GdAlO$_3$ phase and the black portions are an $\alpha$-Al$_2$O$_3$ phase.

It was demonstrated that the ceramic composite of the solidified body does not include any colony or grain boundary phase, that pores or voids do not exist, and that a uniform structure is obtained.

Further, in X-ray diffraction patterns of the ceramic composite obtained from the plane perpendicular to the direction of the solidification, only a diffraction peak from a specific plane of $\alpha$-Al$_2$O$_3$ and diffraction peaks from a plurality of planes of GdAlO$_3$ were observed, demonstrating that the solidified body was a ceramic composite consisting of an $\alpha$-Al$_2$O$_3$ single crystal phase and a GdAlO$_3$ polycrystal phase.

The mechanical strengths of the ceramic composite are shown in Tables 1 and 3, where the three point bending strength was measured at 1600° C. in air with a strain speed of 10$^{-4}$ sec. The ceramic composite was kept at 1700° C. for 50 hours and the increase in weight was 0.003 g/cm$^3$.

Example 3

The procedures of Example 2 were repeated, except that the moving speed of the crucible was 50 mm/hour, to obtain a solidified body.

Figure 3:
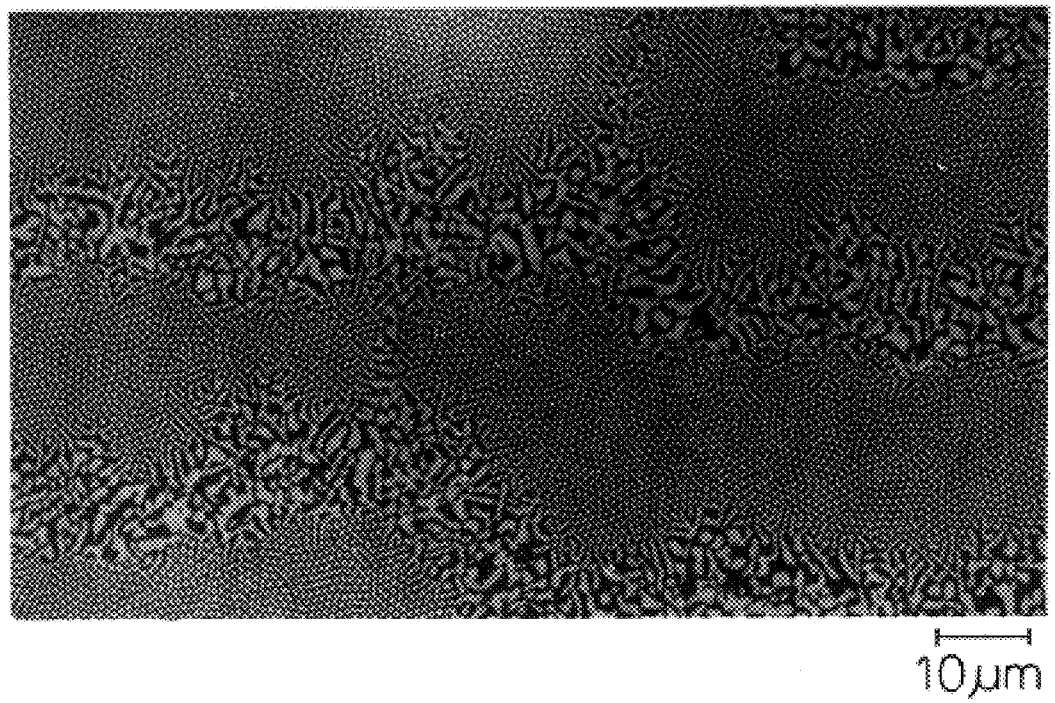
FIGS. 3 and 4 are scanning electron microphotographs showing a ceramic composite obtained in Example 3.
Figure 4:
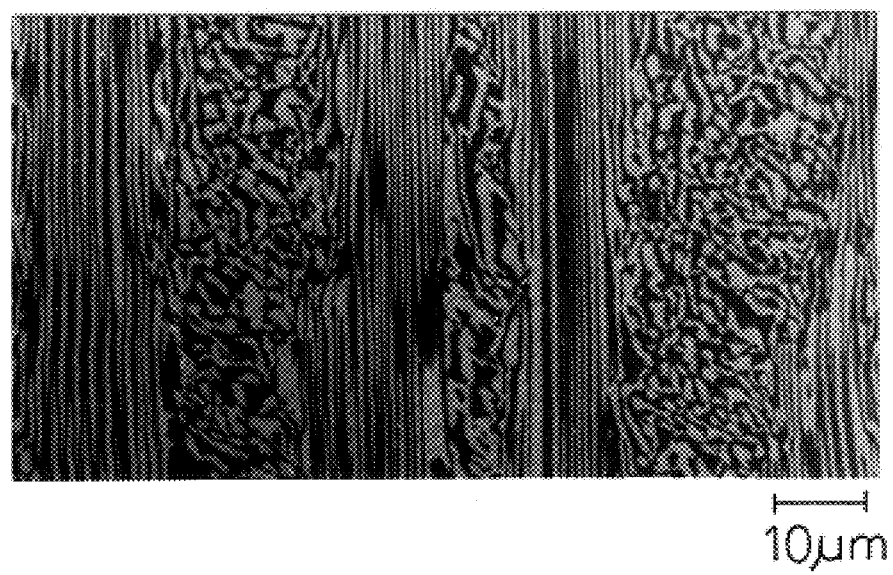

FIGS. 3 and 4 show scanning electron micrographs of the solidified body in section cut perpendicular to and in parallel to the direction of the solidification. It is seen that this solidified body has a unique structure consisting of a structure which is finer than that of Example 2 and a structure wherein a GdAlO$_3$ phase in the form of fibers is uniformly dispersed in an Al$_2$O$_3$ phase.

The mechanical strength of this ceramic composite is shown in Table 2, wherein the three point bending strength was measured at 1600° C. in air.

TABLE 2

|  | Example 3 | Comparative Example 1 |
| --- | --- | --- |
| Three point bending strength (MPa) | 800 | 100 |

Comparative Example 1

$\alpha$-Al$_2$O$_3$ powder and Gd$_2$O$_3$ powder in the same molar ratio as in Example 1 were milled in a wet mill using ethanol. The obtained slurry was dried in a rotary evaporator to remove the ethanol.

The obtained mixed powder of $\alpha$-Al$_2$O$_3$ and Gd$_2$O$_3$ was charged in a graphite die and sintered, while being pressed at 500 kg/mm$^2$ in an atmospheric pressure of 10$^{-2}$ Torr, at a temperature of 1680° C. for 2 hours to obtain a sintered body.

From the X-ray body diffraction of the thus obtained sintered body, diffraction peaks from a plurality of planes of $\alpha$-Al$_2$O$_3$ and a plurality of planes of GdAlO$_3$ were observed.

Figure 5:
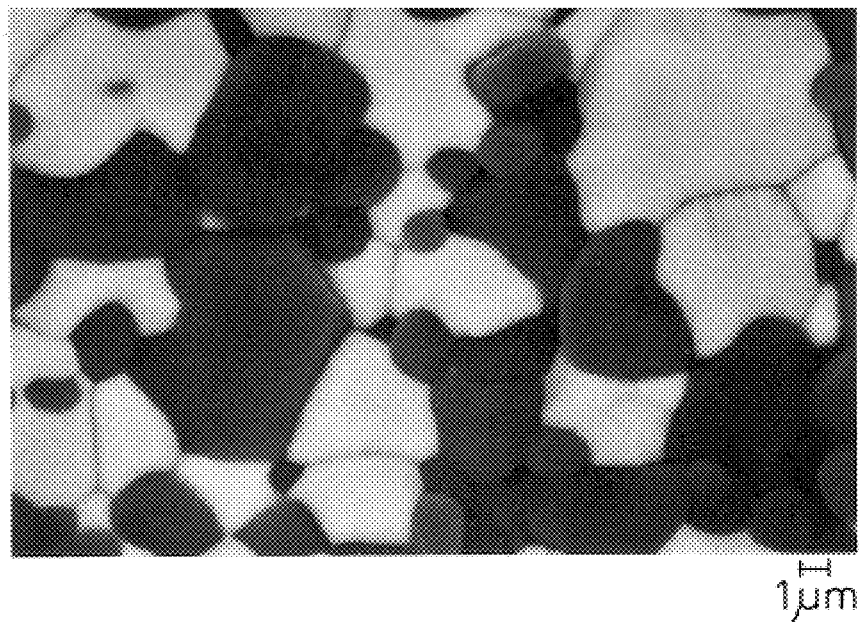
FIG. 5 is a scanning electron microphotograph showing a ceramic composite obtained in Comparative Example 1.

FIG. 5 shows scanning electron micrograph of the thus obtained sintered body in a section cut perpendicular to the direction of the pressing during sintering. In the photograph, the white portions are GdAlO$_3$ grains and the black portions are $\alpha$-Al$_2$O$_3$ grains.

It was demonstrated that the sintered body was a ceramic composite comprising $\alpha$-Al$_2$O$_3$ grains and GdAlO$_3$ grains.

The mechanical strengths of the ceramic composites are shown in Tables 2 and 3, where the three point bending strengths and the compressive creep strength were measured at 1600° C. in air.

TABLE 3

|  | Example 2 | Comparative Example 1 |
| --- | --- | --- |
| Compression creep strength (MPa) | 400 | 100 |

Example 4

$\alpha$-Al$_2$O$_3$ powder and Er$_2$O$_3$ powder in a molar ratio of 81.1% by mole of the former to 18.9% by mole of the latter were milled in a wet mill using ethanol. The obtained slurry was dried in a rotary evaporator to remove the ethanol.

The obtained mixed powder of $\alpha$-Al$_2$O$_3$ and Er$_2$O$_3$ was charged in a molybdenum crucible in a chamber, in which the atmospheric pressure was maintained at 10$^{-5}$ Torr, and the crucible was heated by an induction coil to 1900 to 2000° C. to melt the mixed powder in the crucible. Subsequently, unidirectional solidification was conducted by lowering the crucible at a speed of 5 mm/hour, under the above atmospheric pressure, to obtain a unidirectionally solidified body.

Figure 6:
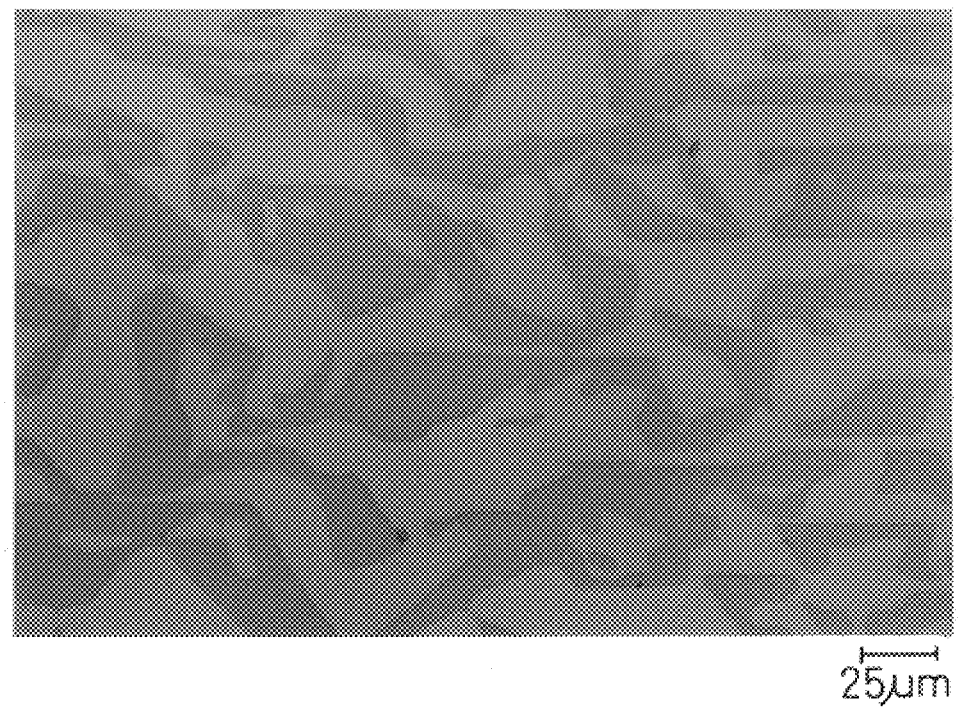
FIG. 6 is a scanning electron microphotograph showing a ceramic composite obtained in Example 4.

FIG. 6 shows scanning electron micrograph of the thus obtained solidified body in a section cut perpendicular to the direction of the solidification. In the photograph, the white portions are a Er$_3$Al$_5$O$_{12}$ phase and the black portions are an $\alpha$-Al$_2$O$_3$ phase.

It was demonstrated that the ceramic composite of the solidified body does not include any colony or grain boundary phase, that pores or voids do not exist, and that a uniform structure is obtained.

Further, in X-ray diffraction patterns of the ceramic composite obtained from the plane perpendicular to the direction of the solidification, only a diffraction peak from a specific plane of $\alpha$-$Al_2O_3$ and a diffraction peak from a specific plane of $Er_3Al_5O_{12}$ were observed, demonstrating that the solidified body was a ceramic composite consisting of an $\alpha$-$Al_2O_3$ single crystal phase and a $Er_3Al_5O_{12}$ single crystal phase.

The mechanical strengths of the ceramic composite is shown in Tables 4 and 6, where the three point bending strength was measured at 1800° C. in air and the compressive creep strength was measured at 1600° C. in air with a strain speed of $10^{-4}$/sec. The ceramic composite was kept at 1700° C. for 50 hours and the increase in weight was 0.002 g/cm$^3$.

TABLE 4

|  | Example 4 | Comparative Example 2 |
|---|---|---|
| Three point bending strength (MPa) | 450 | 40 |

Example 5

$\alpha$-$Al_2O_3$ powder and $Er_2O_3$ powder in a molar ratio of 81.1% by mole of the former to 18.9% by mole of the latter were milled in a wet mill using ethanol. The obtained slurry was dried in a rotary evaporator to remove the ethanol.

The obtained mixed powder of $\alpha$-$Al_2O_3$ and $Er_2O_3$ was charged in a molibdenum crucible in a chamber, in which the atmospheric pressure was maintained at $10^{-5}$ Torr and the crucible was heated by an induction coil to 1900 to 2000° C. to melt the mixed powder in the crucible. Subsequently, unidirectional solidification was conducted by lowering the crucible at a speed of 50 mm/hour, under the above atmospheric pressure, to obtain a unidirectionally solidified body.

Figure 7:
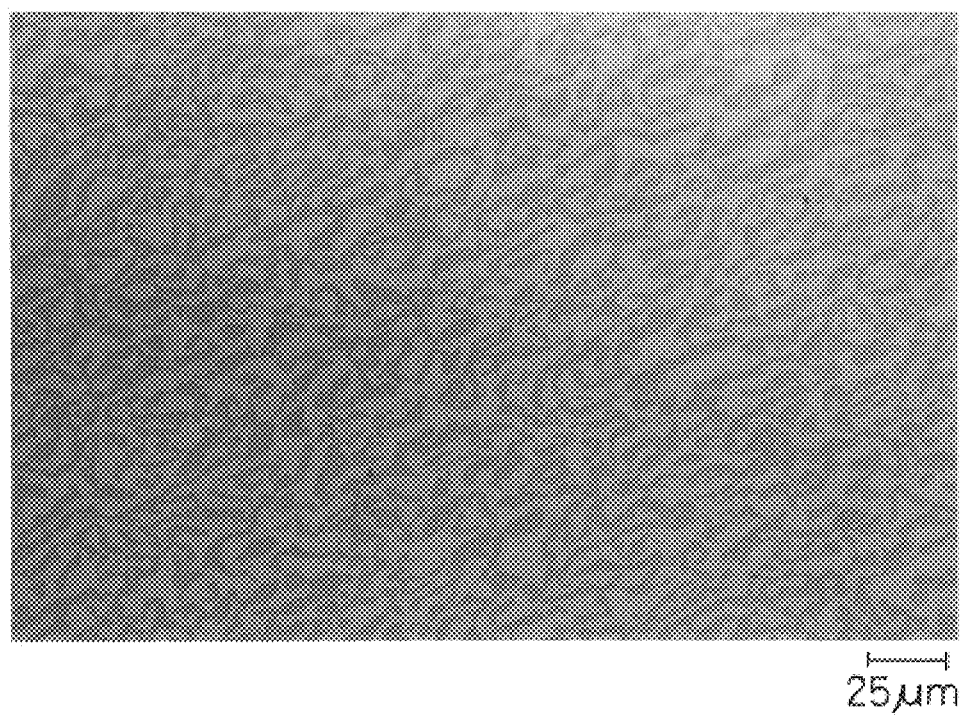
FIG. 7 is a scanning electron microphotograph showing a ceramic composite obtained in Example 5.

FIG. 7 shows scanning electron micrograph of the thus obtained solidified body in a section cut perpendicular to the direction of the solidification. In the photograph, the white portions are a $Er_3Al_5O_{12}$ phase and the black portions are an $\alpha$-$Al_2O_3$ phase.

It was demonstrated that the ceramic composite of the solidified body does not include any colony or grain boundary phase, that pores or voids do not exist, and that a uniform structure is obtained.

Further, in X-ray diffraction patterns of the ceramic composite obtained from the plane perpendicular to the direction of the solidification, only a diffraction peak from a specific plane of $\alpha$-$Al_2O_3$ and diffraction peaks from a plurality of planes of $Er_3Al_5O_{12}$ were observed, demonstrating that the solidified body was a ceramic composite consisting of two phases of an $\alpha$-$Al_2O_3$ single crystal phase and a $Er_3Al_5O_{12}$ polycrystal phase.

The mechanical strengths of the ceramic composite is shown in Tables 5 and 6, where the three point bending strength was measured at 1800° C. in air and the compressive creep strength was measured at 1600° C. in air with a strain speed of $10^{-4}$/sec. The ceramic composite was kept at 1700° C. for 50 hours and the increase in weight was 0.002 g/cm$^3$.

Comparative Example 2

$\alpha$-$Al_2O_3$ powder and $Er_2O_3$ powder in the same molar ratio as in Example 4 were milled in a wet mill using ethanol. The obtained slurry was dried in a rotary evaporator to remove the ethanol.

The obtained mixed powder of $\alpha$-$Al_2O_3$ and $Er_2O_3$ was charged in a graphite die and sintered, while being pressed at 500 kg/mm$^2$ at 1780° C., and an atmospheric pressure of $10^{-2}$ Torr for 2 hours to obtain a sintered body. In x-ray diffraction of the thus obtained sintered body, diffraction peaks from a plurality of planes of $\alpha$-$Al_2O_3$ and diffraction peaks from a plurality of planes of $Er_3Al_5O_{12}$ were observed.

Figure 8:
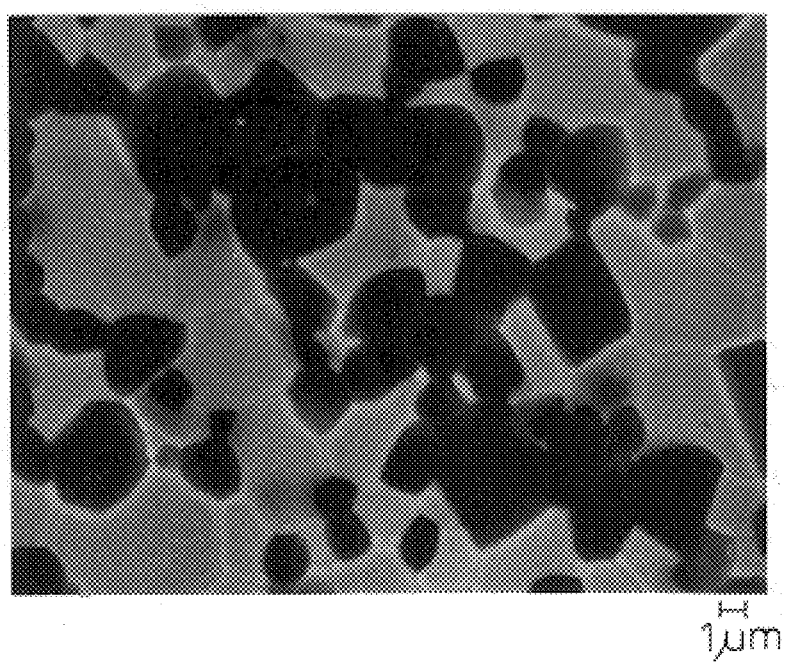
FIG. 8 is a scanning electron microphotograph showing a ceramic composite obtained in Comparative Example 2.

FIG. 8 shows scanning electron micrograph of the sintered body in a section cut perpendicular to the direction of the pressing during the sintering. In the photograph, the white portions are $Er_3Al_5O_{12}$ grains and the black portions are $\alpha$-$Al_2O_3$ grains.

It was demonstrated that the sintered body was a ceramic composite comprising $\alpha$-$Al_2O_3$ grains and $Er_3Al_5O_{12}$ grains.

The mechanical strengths of the ceramic composits are shown in Tables 5 and 6, where the three point bending strength was measured at 1800° C. in air. The compressive creeping strength was measured at 1600° C. in air with a strain speed of $10^{-4}$/sec.

TABLE 5

|  | Example 5 |
|---|---|
| Three point bending strength (MPa) | 600 |

TABLE 6

|  | Example 5 | Comparative Example 2 |
|---|---|---|
| Compression creep strength (MPa) | 480 | 40 |

Example 6

$\alpha$-$Al_2O_3$ powder and $Sm_2O_3$ powder in a molar ratio of 69.0% by mole of the former to 31.0% by mole of the latter were milled in a wet mill using ethanol. The obtained slurry was dried in a rotary evaporator to remove the ethanol.

The obtained mixed powder of $\alpha$-$Al_2O_3$ and $Sm_2O_3$ was charged in a molybdenum crucible in a chamber, in which the atmospheric pressure was maintained at $10^{-5}$ Torr, and the crucible was heated by an induction coil to 1850 to 1950° C. to melt the mixed powder in the crucible. Subsequently, unidirectional solidification was conducted by lowering the crucible at a speed of 50 mm/hour under the above atmospheric pressure to obtain a unidirectionally solidified body.

Figure 9:
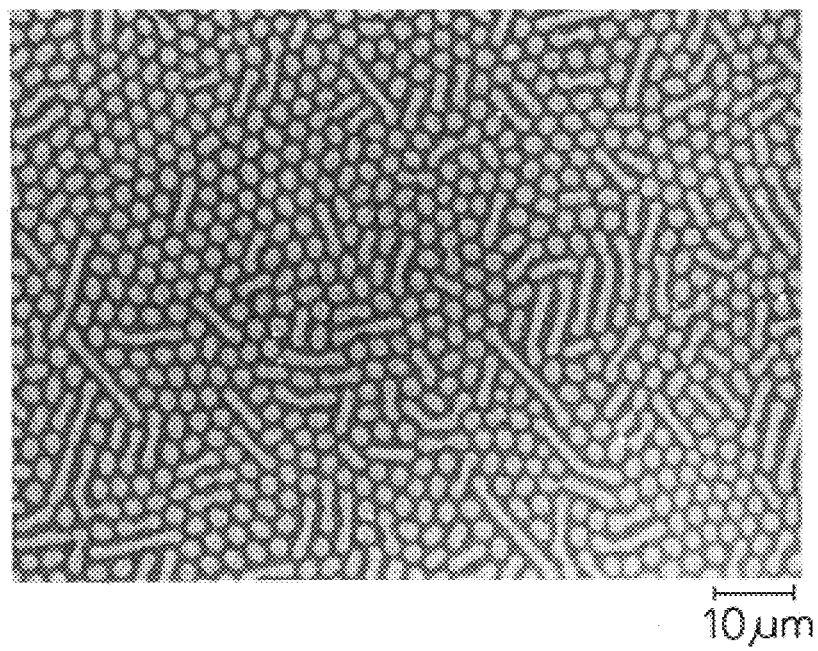
FIGS. 9, 10, 11, 12, 13, 14, 15 and 16 are scanning electron microphotographs showing ceramic composites obtained in Examples 6 to 13, respectively.

FIG. 9 shows scanning electron micrograph of the thus obtained solidified body in a section cut perpendicular to the direction of the solidification. In the photograph, the white portions are a $SmAlO_3$ phase and the black portions are an $\alpha$-$Al_2O_3$ phase.

It was demonstrated that the ceramic composite of the solidified body does not include any colony or grain boundary phase, that pores or voids do not exist, and that a uniform structure is obtained.

Further, in X-ray diffraction patterns of the ceramic composite obtained from the plane perpendicular to the direction of the solidification, diffraction peaks from a plurality of planes of $\alpha$-$Al_2O_3$ and diffraction peaks from a plurality of planes of $SmAlO_3$ were observed, demonstrating that the solidified body was a ceramic composite consisting of an α-Al$_2$O$_3$ polycrystal phase and a SmAlO$_3$ polycrystal phase in which the SmAlO$_3$ phase in the form of fibers is uniformly dispersed in the α-Al$_2$O$_3$ phase.

The mechanical strengths of the ceramic composite is shown in Tables 7 and 8, where the three point bending strength was measured at 1700° C. in air and the compressive creep strength was measured at 1600° C. with a strain speed of 10$^{-4}$/sec. The ceramic composite was kept at 1700° C. for 50 hours and the increase in weight was 0.002 g/cm$^3$.

TABLE 7

|  | Example 6 |
|---|---|
| Three point bending strength (MPa) | 950 |

TABLE 8

|  | Example 6 |
|---|---|
| Compression creep strength (MPa) | 600 |

Example 7

α-Al$_2$O$_3$ powder and Yb$_2$O$_3$ powder in a molar ratio of 83.7% by mole of the former to 16.3% by mole of the latter were milled in a wet mill using ethanol. The obtained slurry was dried in a rotary evaporator to remove ethanol.

The obtained mixed powder of α-Al$_2$O$_3$ and Yb$_2$O$_3$ was charged in a molybdenum crucible in a chamber, in which the atmospheric pressure was maintained at 10$^{-5}$ Torr, and the crucible was heated by an induction coil to 1850 to 1950° C. to melt the mixed powder in the crucible. Subsequently, unidirectional solidification was conducted by lowering the crucible at a speed of 5 mm/hour under the above atmospheric pressure to obtain a unidirectionally solidified body.

Figure 10:
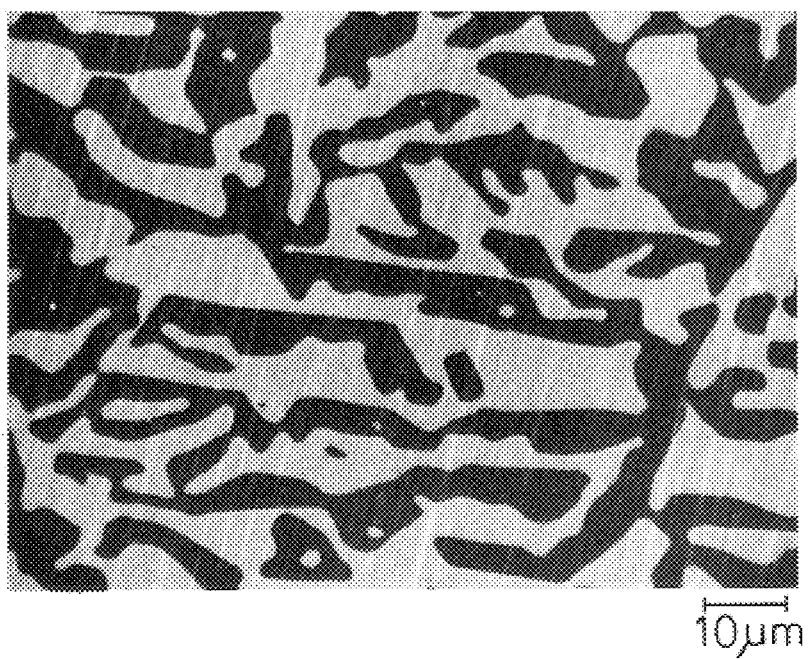

FIG. 10 shows scanning electron micrograph of the thus obtained solidified body in a section cut perpendicular to the direction of the solidification. In the photograph, the white portions are a 3Yb$_2$O$_3$•5Al$_2$O$_3$ phase and the black portions are an α-Al$_2$O$_3$ phase.

It was demonstrated that the ceramic composite of the solidified body does not include any colony or grain boundary phase, pores or voids do not exist, and a uniform structure is obtained.

Further, in X-ray diffraction patterns of the ceramic composite obtained from the plane perpendicular to the direction of the solidification, only a diffraction peak from a specific plane of α-Al$_2$O$_3$ and a diffraction peak from a specific plane of 3Yb$_2$O$_3$•5Al$_2$O$_3$ were observed, demonstrating that the solidified body was a ceramic composite consisting of an α-Al$_2$O$_3$ single crystal phase and a 3Yb$_2$O$_3$•5Al$_2$O$_3$ single crystal phase.

The mechanical strength of the ceramic composite is shown in Table 9, where the three point bending strength was measured at 1600° C. in air. The ceramic composite was kept at 1700° C. for 50 hours and the increase in weight was 0.002 g/cm$^3$.

TABLE 9

|  | Example 7 |
|---|---|
| Three point bending strength (MPa) | 550 |

Example 8

An α-Al$_2$O$_3$ powder and an La$_2$O$_3$ powder in a molar ratio of 77.5% by mole of the former to 22.5% by mole of the latter were milled in a wet mill using ethanol. The obtained slurry was dried in a rotary evaporator to remove ethanol.

The obtained mixed powder of α-Al$_2$O$_3$ and La$_2$O$_3$ was charged in a molybdenum crucible in a chamber, in which the atmospheric pressure was maintained at 10$^{-5}$ Torr and the crucible was heated by an induction coil to 1800 to 1900° C. to melt the mixed powder in the crucible. Subsequently, unidirectional solidification was conducted by lowering the crucible at a speed of 50 mm/hour under the above atmospheric pressure to obtain a unidirectionally solidified body.

Figure 11:
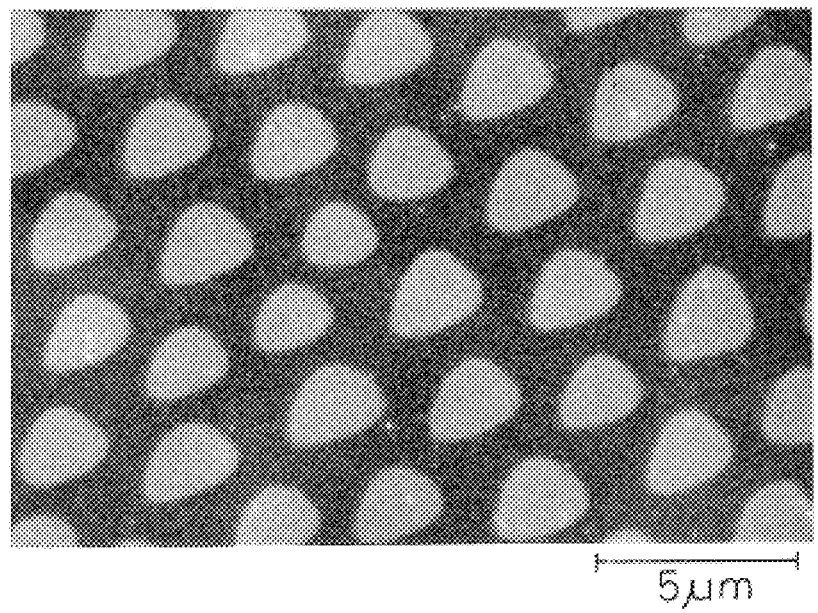

FIG. 11 shows scanning electron micrograph of the thus obtained solidified body in a section cut perpendicular to the direction of the solidification. In the photograph, the white portions are an LaAlO$_3$ phase and the black portions are an α-Al$_2$O$_3$ phase.

It was demonstrated that the ceramic composite of the solidified body does not include any colony or grain boundary phase, that pores or voids do not exist, and that a uniform structure is obtained.

Further, in X-ray diffraction patterns of the ceramic composite obtained from the plane perpendicular to the direction of the solidification, diffraction peaks from a plurality of planes of α-Al$_2$O$_3$ and diffraction peaks from a plurality of planes of LaAlO$_3$ were observed, demonstrating that the solidified body was a ceramic composite consisting of an α-Al$_2$O$_3$ polycrystal phase and an LaAlO$_3$ polycrystal phase, in which the LaAlO$_3$ phase in the form of fibers is uniformly dispersed in the α-Al$_2$O$_3$ phase.

The mechanical strength of the ceramic composite is shown in Table 10, where the three point bending strength was measured at 1600° C. in air. The ceramic composite was kept at 1600° C. for 50 hours and the increase in weight was 0.002 g/cm$^3$.

TABLE 10

|  | Example 8 |
|---|---|
| Three point bending strength (MPa) | 750 |

Example 9

An α-Al$_2$O$_3$ powder and an Nd$_2$O$_3$ powder in a molar ratio of 80.3% by mole of the former to 19.7% by mole of the latter were milled in a wet mill using ethanol. The obtained slurry was dried in a rotary evaporator to remove the ethanol.

The obtained mixed powder of α-Al$_2$O$_3$ and Nd$_2$O$_3$ was charged in a molybdenum crucible in a chamber, in which the atmospheric pressure was maintained at 10$^{-5}$ Torr and the crucible was heated, by an induction coil, to 1850 to 1950° C. to melt the mixed powder in the crucible.

Subsequently, unidirectional solidification was conducted by lowering the crucible at a speed of 20 mm/hour, under the above atmospheric pressure, to obtain a unidirectionally solidified body.

Figure 12:
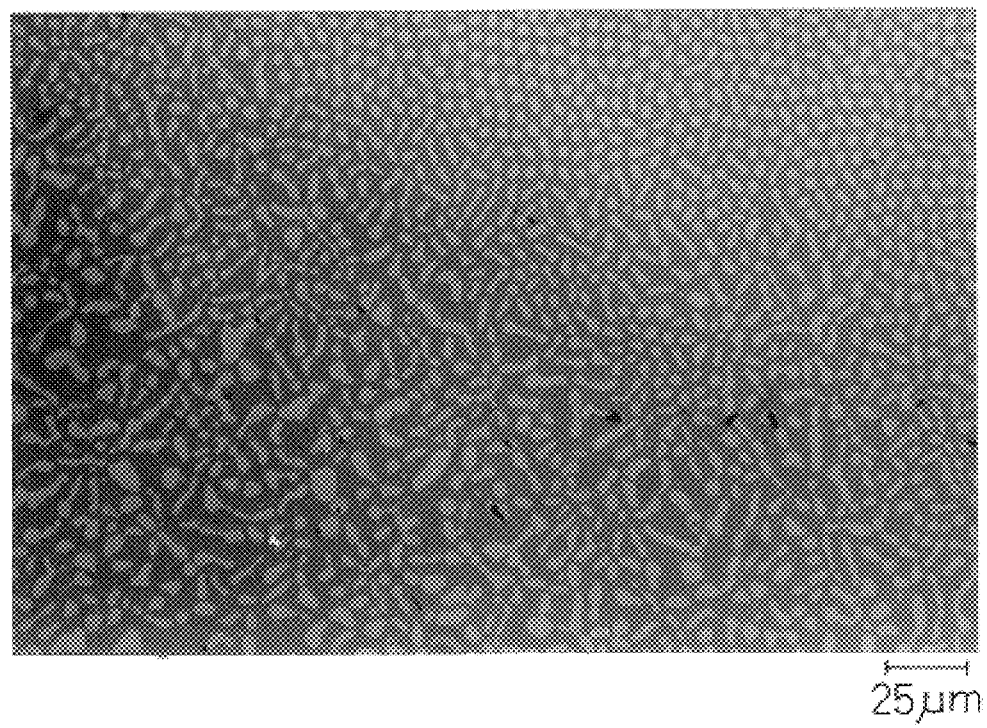

FIG. 12 shows scanning electron micrograph of the thus obtained solidified body in a section cut perpendicular to the direction of the solidification. In the photograph, the white portions are an $NdAl_{11}O_{18}$ phase and the black portions are an $AlNdO_3$ phase.

It was demonstrated that the ceramic composite of the solidified body does not include any colony or grain boundary phase, that pores or voids do not exist, and that a uniform structure is obtained.

Further, in X-ray diffraction patterns of the ceramic composite obtained from the plane perpendicular to the direction of the solidification, a diffraction peak from a specific plane of $NdAl_{11}O_{18}$ and diffraction peaks from a plurality of planes of $AlNdO_3$ were observed, demonstrating that the solidified body was a ceramic composite consisting of an $NdAl_{11}O_{18}$ single crystal phase and an $AlNdO_3$ polycrystal phase.

The mechanical strength of the ceramic composite is shown in Table 11, where the three point bending strength was measured at 1700° C. in air.

Example 10

An $\alpha$-$Al_2O_3$ powder and an $Nd_2O_3$ powder in a molar ratio of 80.3% by mole of the former to 19.7% by mole of the latter were milled in a wet mill using ethanol. The obtained slurry was dried in a rotary evaporator to remove the ethanol.

The obtained mixed powder of $\alpha$-$Al_2O_3$ and $Nd_2O_3$ was charged in a molybdenum crucible in a chamber, in which the atmospheric pressure was maintained at $10^{-5}$ Torr, and the crucible was heated by an induction coil to 1850 to 1950° C. to melt the mixed powder in the crucible. Subsequently, unidirectional solidification was conducted by lowering the crucible, at a speed of 50 mm/hour under the above atmospheric pressure, to obtain a unidirectionally solidified body.

Figure 13:
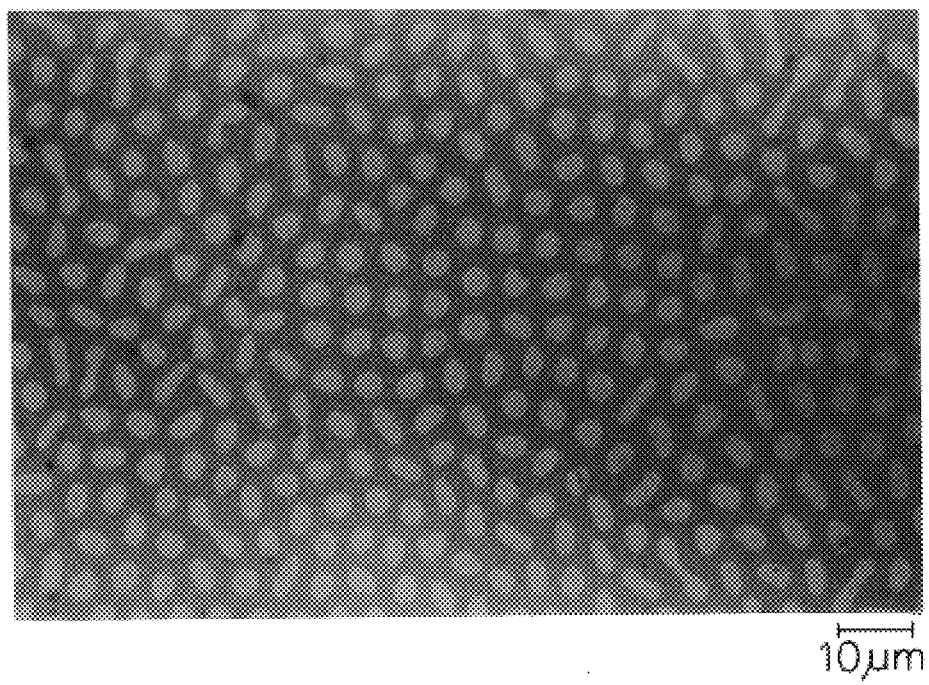

FIG. 13 shows scanning electron micrograph of the thus obtained solidified body in a section cut perpendicular to the direction of the solidification. In the photograph, the white portions are an $NdAl_{11}O_{18}$ phase and the black portions are an $AlNdO_3$ phase.

It was demonstrated that the ceramic composite of the solidified body does not include any colony or grain boundary phase, that pores or voids do not exist, and that a uniform structure is obtained.

Further, in X-ray diffraction patterns of the ceramic composite obtained from the plane perpendicular to the direction of the solidification, diffraction peaks from a plurality of planes of $NdAl_{11}O_{18}$ and diffraction peaks from a plurality of planes of $AlNdO_3$ were observed, demonstrating that the solidified body was a ceramic composite consisting of an $NdAl_{11}O_{18}$ polycrystal phase and an $AlNdO_3$ polycrystal phase, wherein the $NdAl_{11}O_{18}$ phase in the form of fibers is uniformly dispersed in the $AlNdO_3$ phase.

The mechanical strength of the ceramic composite is shown in Table 11, where the three point bending strength was measured at 1700° C. in air.

TABLE 11

|  | Example 9 | Example 10 |
|---|---|---|
| Three point bending strength (MPa) | 800 | 1000 |

Example 11

An $\alpha$-$Al_2O_3$ powder and an $Eu_2O_3$ powder in a molar ratio of 71.7% by mole of the former to 28.3% by mole of the latter were milled in a wet mill using ethanol. The obtained slurry was dried in a rotary evaporator to remove the ethanol.

The obtained mixed powder of $\alpha$-$Al_2O_3$ and $Eu_2O_3$ was charged in a molybdenum crucible in a chamber, in which the atmospheric pressure was maintained at $10^{-5}$ Torr, and the crucible was heated by an induction coil to 1750 to 1850° C. to melt the mixed powder in the crucible. Subsequently, unidirectional solidification was conducted by lowering the crucible at a speed of 20 mm/hour under the above atmospheric pressure to obtain a unidirectionally solidified body.

Figure 14:
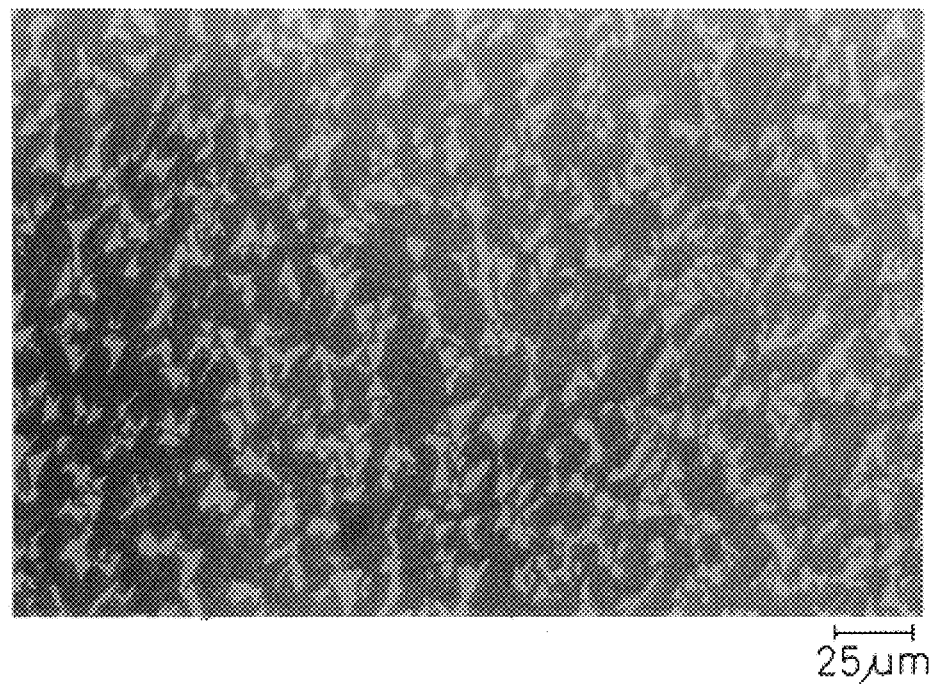

FIG. 14 shows scanning electron micrograph of the thus obtained solidified body in a section cut perpendicular to the direction of the solidification. In the photograph, the white portions are an $AlEuO_3$ phase and the black portions are an $EuAl_{11}O_{18}$ phase.

It was demonstrated that the ceramic composite of the solidified body does not include any colony or grain boundary phase, that pores or voids do not exist, and that a uniform structure is obtained.

Further, in X-ray diffraction patterns of the ceramic composite obtained from the plane perpendicular to the direction of the solidification, only a diffraction peak from a specific plane of $AlEuO_3$ and diffraction peaks from a plurality of planes of $EuAl_{11}O_{18}$ were observed, demonstrating that the solidified body was a ceramic composite consisting of an $AlEuO_3$ single crystal phase and an $EuAl_{11}O_{18}$ polycrystal phase.

The mechanical strength of the ceramic composite is shown in Table 12, where the three point bending strength was measured at 1600° C. in air.

Example 12

An $\alpha$-$Al_2O_3$ powder and a $Pr_6O_{11}$ powder in a molar ratio of 78.8% by mole of the former to 21.2% by mole of the latter were milled in a wet mill using ethanol. The obtained slurry was dried in a rotary evaporator to remove the ethanol.

The obtained mixed powder of $\alpha$-$Al_2O_3$ and $Pr_6O_{11}$ was charged in a molybdenum crucible in a chamber, in which the atmospheric pressure was maintained at $10^{-5}$ Torr, and the crucible was heated by an induction coil to 1900 to 1950° C. to melt the mixed powder in the crucible. Subsequently, unidirectional solidification was conducted by lowering the crucible at a speed of 20 mm/hour under the above atmospheric pressure to obtain a unidirectionally solidified body.

Figure 15:
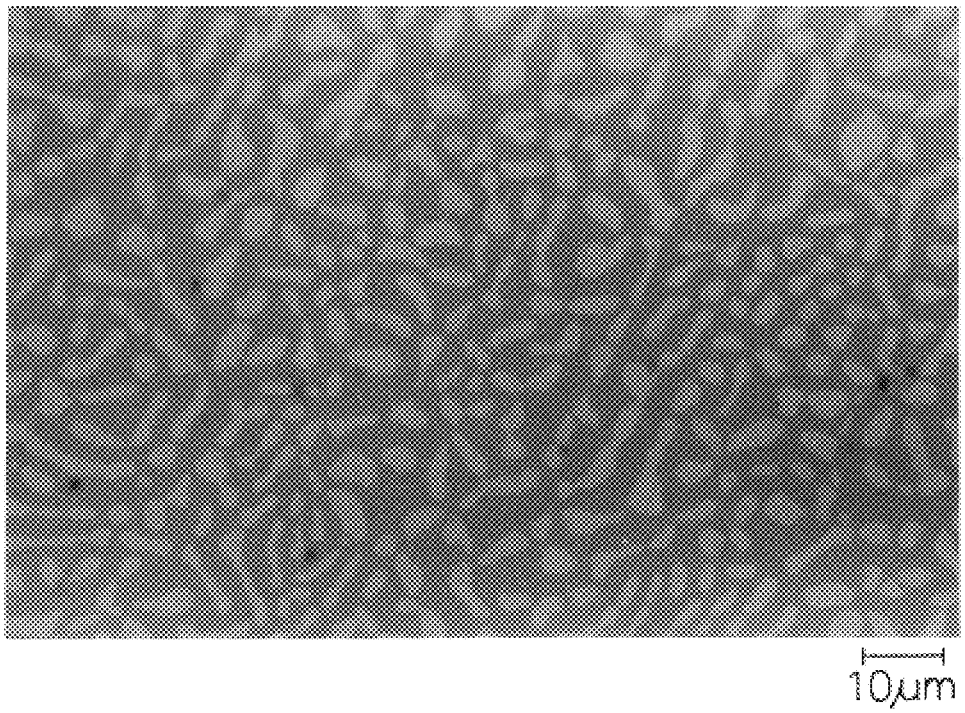

FIG. 15 shows scanning electron micrograph of the thus obtained solidified body in a section cut perpendicular to the direction of the solidification. In the photograph, the white portions are a $PrAlO_3$ phase and the black portions are a $PrAl_{11}O_{18}$ phase, both phases being a complex metal oxide.

It was demonstrated that the ceramic composite of the solidified body does not include any colony or grain boundary phase, that pores or voids do not exist, and that a uniform structure is obtained.

Further, in X-ray diffraction patterns of the ceramic composite obtained from the plane perpendicular to the direction of the solidification, only a diffraction peak from a specific plane of $PrAl_{11}O_{18}$ and diffraction peaks from a plurality of planes of $PrAlO_3$ were observed, demonstrating that the solidified body was a ceramic composite consisting of a $PrAl_{11}O_{18}$ single crystal phase and a $PrAlO_3$ polycrystal phase.

The mechanical strength of the ceramic composite is shown in Table 12, where the three point bending strength was measured at 1600° C. in air.

TABLE 12

|  | Example 1 | Example 12 |
| --- | --- | --- |
| Three point bending strength (MPa) | 650 | 700 |

Example 13

$\alpha$-$Al_2O_3$ powder and $SiO_2$ powder in a molar ratio of 68.0% by mole of the former to 32.0% by mole of the latter were milled in a wet mill using ethanol. The obtained slurry was dried in a rotary evaporator to remove the ethanol.

The obtained mixed powder of $\alpha$-$Al_2O_3$ and $SiO_2$ was charged in a molybdenum crucible in a chamber, in which the atmospheric pressure was maintained at $10^{-2}$ Torr, and the crucible was heated by an induction coil to 1950 to 2100° C. to melt the mixed powder in the crucible. Subsequently, unidirectional solidification was conducted by lowering the crucible at a speed of 5 mm/hour under the above atmospheric pressure to obtain a unidirectionally solidified body.

Figure 16:
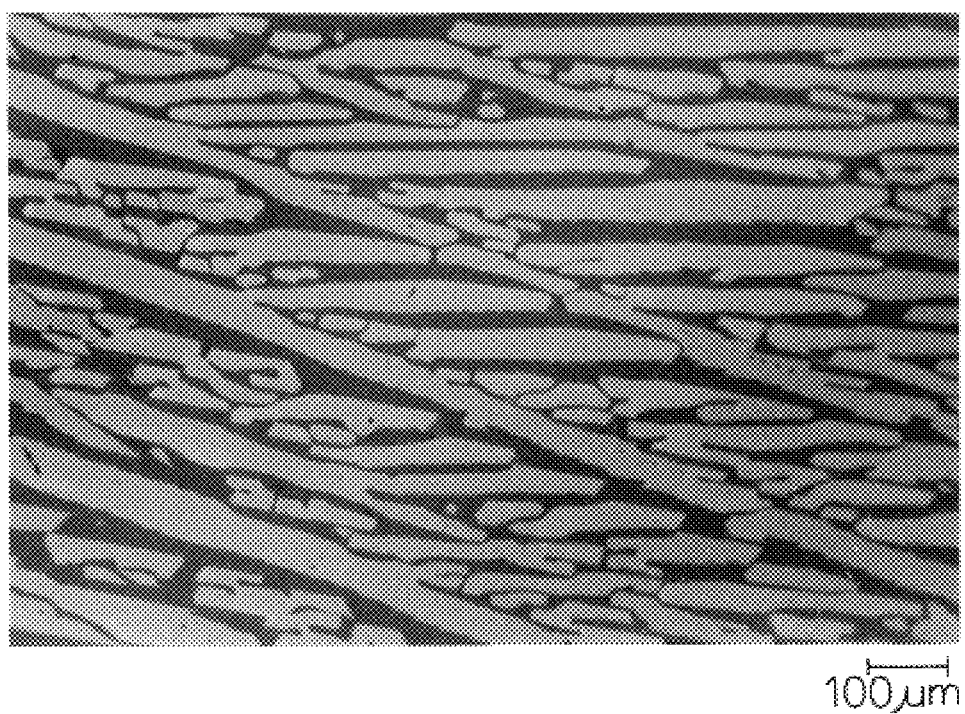

FIG. 16 shows scanning electron micrograph of the thus obtained solidified body in a section cut perpendicular to the direction of the solidification. In the photograph, the white portions are a $3Al_2O_3 \cdot 2SiO_2$ (mullite) phase and the dark portions are an $\alpha$-$Al_2O_3$ phase.

It was demonstrated that the ceramic composite of the solidified body does not include any colony or grain boundary phase, that pores or voids do not exist, and that a uniform structure is obtained.

Further, in X-ray diffraction patterns of the ceramic composite obtained from the plane perpendicular to the direction of the solidification, only a diffraction peak from a specific plane of $\alpha$-$Al_2O_3$ and a diffraction peak from a specific plane of $3Al_2O_3 \cdot 2SiO_2$ were observed, demonstrating that the solidified body was a ceramic composite consisting of an $\alpha$-$Al_2O_3$ single crystal phase and a $3Al_2O_3 \cdot 2SiO_2$ single crystal phase.

The mechanical strength of the ceramic composite is shown in Table 13, where the three point bending strength was measured at 1850° C. in argon. The ceramic composite was kept at 1700° C. for 50 hours and the increase in weight was 0.003 g/cm$^3$.

In the same manner as above, starting powders of other metal oxides were prepared and unidirectionally solidified. The constituent phases and the results of X-ray diffraction peaks of the solidifid bodies are shown in Table 13. The ceramic composite of these solidified bodies were found to be ceramic composites which do not include any colony and grain boundary phase and have a uniform structure.

Comparative Example 3

The procecures of Example 13 were repeated except that the pressure in the chamber was changed to normal pressure (atmospheric pressure).

Figure 17:
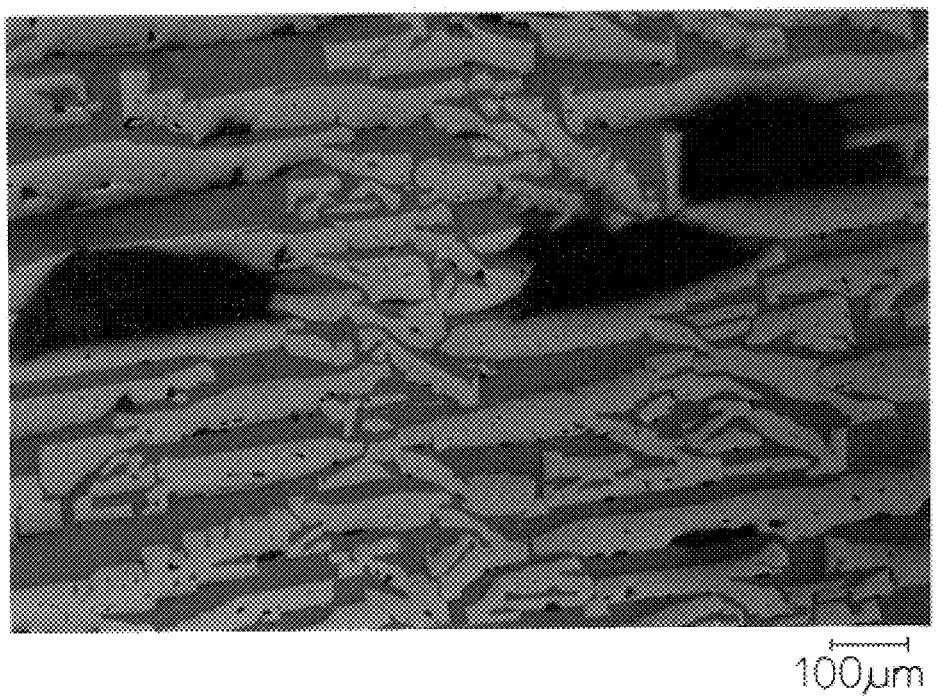
FIG. 17 is a scanning electron microphotograph showing a ceramic composite obtained in Comparative Example 3.

FIG. 17 shows scanning electron micrograph of the thus obtained solidified body consisting of $\alpha$-$Al_2O_3$ and $3Al_2O_3 \cdot 2SiO_2$ in a section cut perpendicular to the direction of the solidification. It was demonstrated that the ceramic composite of the solidified body included colonies and grain boundary phases as well as pores.

Further, in X-ray diffraction patterns of the ceramic composite obtained from the plane perpendicular to the direction of the solidification, diffraction peaks from a plurality planes of $\alpha$-$Al_2O_3$ and diffraction peaks from a plurality of planes of $3Al_2O_3 \cdot 2SiO_2$ were observed, demonstrating that the solidified body was a ceramic composite consisting of an $\alpha$-$Al_2O_3$ polycrystal phase and $3Al_2O_3 \cdot 2SiO_2$ polycrystal phase.

In the same manner as above, starting powders of other metal oxides were prepared and unidirectionally solidified. The constituent phases and the results of the X ray diffractions of the obtained solidified bodies are shown in Table 14. It was found that these ceramic composites include colonies and grain boudnary phases as well as pores.

TABLE 13

| Starting powders and their proportions (mole %) | | Phases constituting ceramic composite | Results of X ray diffraction |
| --- | --- | --- | --- |
| xA | yB | | |
| 68% $Al_2O_3$ | 32% $SiO_2$ | $\alpha$-$Al_2O_3$ | single crystal |
| | | $3Al_2O_3.2SiO_2$ | single crystal |
| 60% $Y_2O_3$ | 40% $Al_2O_3$ | $2Y_2O_3.Al_2O_3$ | single crystal |
| | | $3Y_2O_3.5Al_2O_3$ | single crystal |
| 78% NiO | 22% $Y_2O_3$ | NiO | single crystal |
| | | $Y_2O_3$ | single crystal |
| 80% $TiO_2$ | 20% $Al_2O_3$ | $\alpha$-$Al_2O_3$ | single crystal |
| | | $TiO_2$ | single crystal |

TABLE 14

| Starting powders and their proportions (mole %) | | Phases constituting ceramic composite | Results of X ray diffraction |
| --- | --- | --- | --- |
| xA | yB | | |
| 68% $Al_2O_3$ | 32% $SiO_2$ | $\alpha$-$Al_2O_3$ | polycrystal |
| | | $3Al_2O_3.2SiO_2$ | polycrystal |
| 60% $Y_2O_3$ | 40% $Al_2O_3$ | $2Y_2O_3.Al_2O_3$ | polycrystal |
| | | $3Y_2O_3.5Al_2O_3$ | polycrystal |
| 78% NiO | 22% $Y_2O_3$ | NiO | polycrystal |
| | | $Y_2O_3$ | polycrystal |
| 80% $TiO_2$ | 20% $Al_2O_3$ | $\alpha$-$Al_2O_3$ | polycrystal |
| | | $TiO_2$ | polycrystal |

Example 14

An $\alpha$-$Al_2O_3$ powder and an $SiO_2$ powder in a molar ratio of 68.0% by mole of the former to 32.0% by mole of the latter were milled in a wet mill using ethanol. The obtained slurry was dried in a rotary evaporator to remove the ethanol.

The obtained mixed powder of $\alpha$-$Al_2O_3$ and $SiO_2$ was charged in a molybdenum crucible in a chamber, in which the atmospheric pressure was maintained at $10^{-2}$ Torr and the crucible was heated by an induction coil to 1950 to 2100° C. to melt the mixed powder in the crucible. Subsequently, unidirectional solidification was conducted by lowering the crucible at a speed of 60 mm/hour under the above atmospheric pressure to obtain a unidirectionally solidified body.

Figure 18:
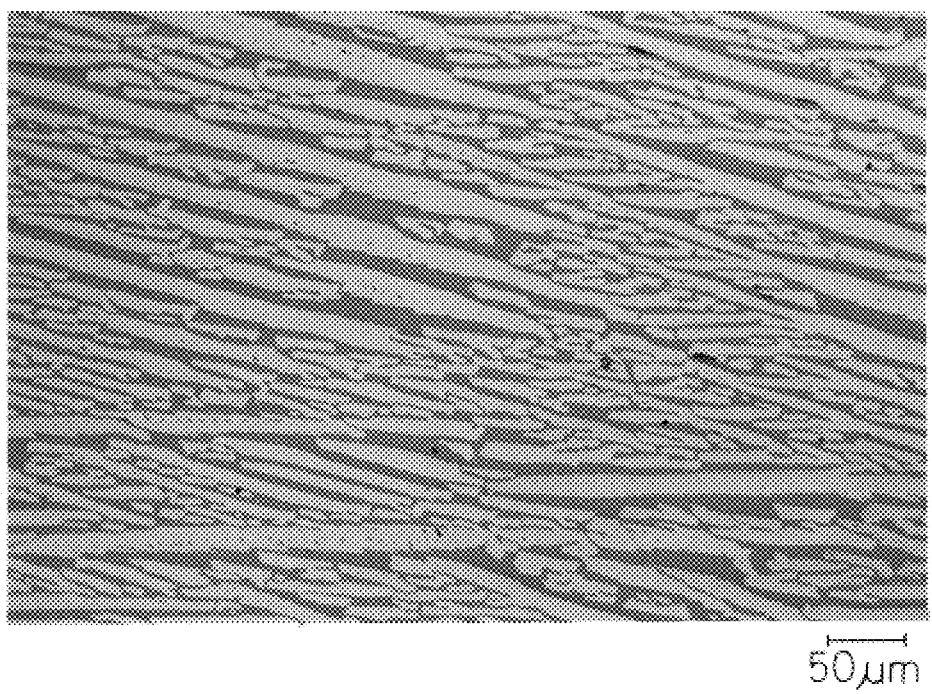
FIG. 18 is a scanning electron microphotograph showing a ceramic composite obtained in Example 14.

FIG. 18 shows scanning electron micrograph of the thus obtained solidified body in a section cut perpendicular to the direction of the solidification. In the photograph, the white portions are a 3Al$_2$O$_3$•2Al$_2$O$_3$ (mullite) phase and the dark portions are an α-Al$_2$O$_3$ phase.

It was demonstrated that the ceramic composite of the solidified body does not include any colony or grain boundary phase, that pores or voids do not exist, and that a uniform structure is obtained.

Further, in X-ray diffraction patterns of the ceramic composite obtained from the plane perpendicular to the direction of the solidification, only a diffraction peak from a specific plane of α-Al$_2$O$_3$ and diffraction peaks from a plularity of planes of 3Al$_2$O$_3$•2SiO$_2$ were observed, demonstrating that the solidified body was a ceramic composite consisting of two phases of an α-Al$_2$O$_3$ single crystal phase and a 3Al$_2$O$_3$•2SiO$_2$ single crystal phase.

The mechanical strength of the ceramic composite is shown in Table 13, where the three point bending strength was measured at 1700° C. in argon. The ceramic composite was kept at 1700° C. for 50 hours and the increase in weight was 0.003 g/cm$^3$.

In the same manner as above, starting powders of other metal oxides were prepared and unidirectionally solidified. The constituent phases and the results of X ray diffraction of the obtained solidified bodies are shown in Table 15. It was found that these were ceramic composites had a uniform structure without any colonies and grain boundary phases.

Comparative Example 4

The procedures of Example 14 were repeated except that the pressure in the chamber was changed to normal pressure (atmospheric pressure).

Figure 19:
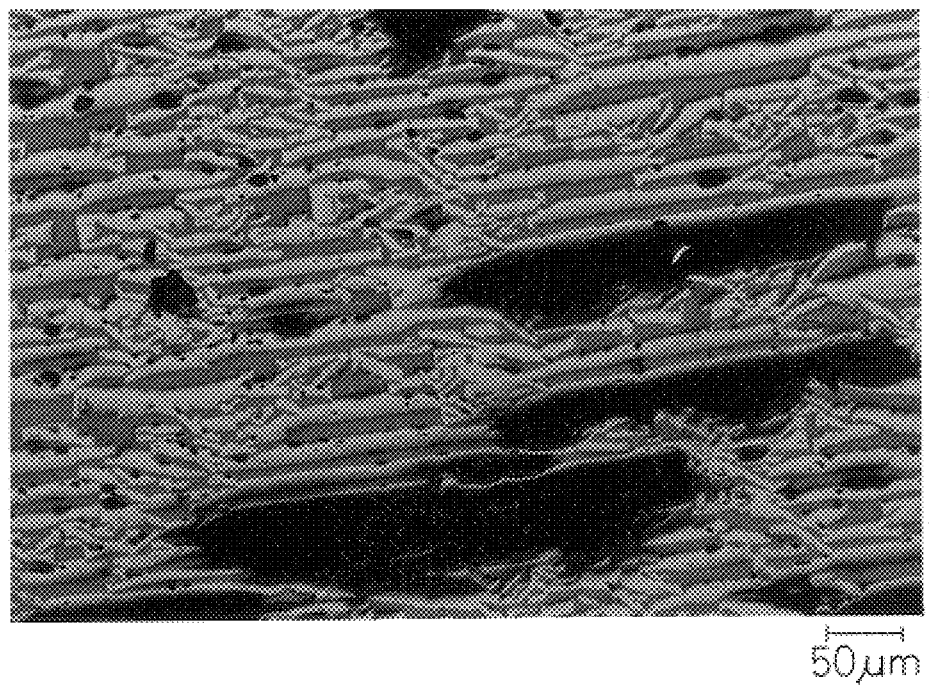
FIG. 19 is a scanning electron microphotograph showing a ceramic composite obtained in Comparative Example 4.

FIG. 19 shows scanning electron micrograph of the thus obtained solidified body consisting of α-Al$_2$O$_3$ and 3Al$_2$O$_3$•2SiO$_2$ in a section cut perpendicular to the direction of the solidification. It was demonstrated that the ceramic composite of the solidified body included colonies and grain boundary phases as well as pores.

Further, in X-ray diffraction patterns of the ceramic composite obtained from the plane perpendicular to the direction of the solidification, diffraction peaks from a plurality of planes of α-Al$_2$O$_3$ and diffraction peaks from a plurality of planes of 3Al$_2$O$_3$•2SiO$_2$ were observed, demonstrating that the solidified body was a ceramic composite consisting of an α-Al$_2$O$_3$ polycrystal phase and a 3Al$_2$O$_3$•2SiO$_2$ polycrystal phase.

In the same manner as above, starting powders of other metal oxides were prepared and unidirectionally solidified. The constituent phases and the results of X ray diffraction of the obtained solidified bodies are shown in Table 16. It was found that these bodies were ceramic composites which included colonies and grain boundaries as well as pores.

TABLE 15

| Starting powders and their proportions (mole %) | | Phases constituting ceramic composite | Results of X ray diffraction |
| --- | --- | --- | --- |
| xA | yB | | |
| 68% Al$_2$O$_3$ | 32% SiO$_2$ | α-Al$_2$O$_3$ 3Al$_2$O$_3$.2SiO$_2$ | single crystal polycrystal |
| 60% Y$_2$O$_3$ | 40% Al$_2$O$_3$ | 2Y$_2$O$_3$.Al$_2$O$_3$ 3Y$_2$O$_3$.5Al$_2$O$_3$ | single crystal polycrystal |
| 78% NiO | 22% Y$_2$O$_3$ | NiO Y$_2$O$_3$ | single crystal polycrystal |

TABLE 15-continued

| Starting powders and their proportions (mole %) | | Phases constituting ceramic composite | Results of X ray diffraction |
| --- | --- | --- | --- |
| xA | yB | | |
| 80% TiO$_2$ | 20% Al$_2$O$_3$ | α-Al$_2$O$_3$ TiO$_2$ | single crystal polycrystal |

TABLE 16

| Starting powders and their proportions (mole %) | | Phases constituting ceramic composite | Results of X ray diffraction |
| --- | --- | --- | --- |
| xA | yB | | |
| 68% Al$_2$O$_3$ | 32% SiO$_2$ | α-Al$_2$O$_3$ 3Al$_2$O$_3$.2SiO$_2$ | polycrystal polycrystal |
| 60% Y$_2$O$_3$ | 40% Al$_2$O$_3$ | 2Y$_2$O$_3$.Al$_2$O$_3$ 3Y$_2$O$_3$.5Al$_2$O$_3$ | polycrystal polycrystal |
| 78% NiO | 22% Y$_2$O$_3$ | NiO Y$_2$O$_3$ | polycrystal polycrystal |
| 80% TiO$_2$ | 20% Al$_2$O$_3$ | α-Al$_2$O$_3$ TiO$_2$ | polycrystal polycrystal |

Example 15

α-Al$_2$O$_3$ powder and SiO$_2$ powder in a molar ratio of 68.0% by mole of the former to 32.0% by mole of the latter were milled in a wet mill using ethanol. The obtained slurry was dried in a rotary evaporator to remove the ethanol.

The obtained mixed powder of α-Al$_2$O$_3$ and SiO$_2$ was charged in a molybdenum crucible in a chamber, in which the atmospheric pressure was maintained at 10$^{-2}$ Torr, and the crucible was heated by an induction coil to 1950 to 2100° C. to melt the mixed powder in the crucible. Subsequently, unidirectional solidification was conducted by lowering the crucible at a speed of 220 mm/hour under the above atmospheric pressure to obtain a unidirectionally solidified body.

Figure 20:
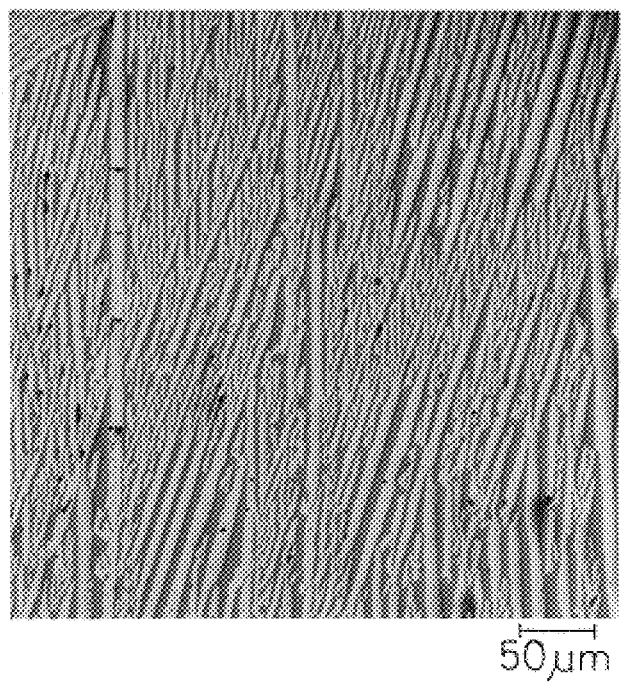
FIG. 20 is a scanning electron microphotograph showing a ceramic composite obtained in Example 15.

FIG. 20 shows scanning electron micrograph of the thus obtained solidified body in a section cut perpendicular to the direction of the solidification. In the photograph, the white portions are a 3Al$_2$O$_3$•2SiO$_2$ (mullite) phase and the dark portions are an α-Al$_2$ O$_3$ phase.

It was demonstrated that the ceramic composite of the solidified body does not include any colony or grain boundary phase, that pores or voids do not exist, and that a uniform structure is obtained.

Further, in X-ray diffraction patterns of the ceramic composite obtained from the plane perpendicular to the direction of the solidification, diffraction peaks from a plurality of planes of α-Al$_2$O$_3$ and diffraction peaks from a plurality of planes of 3Al$_2$O$_3$•2SiO$_2$ were observed, demonstrating that the solidified body was a ceramic composite consisting of two phases of an α-Al$_2$O$_3$ polycrystal phase and a 3Al$_2$O$_3$•2SiO$_2$ polycrystal phase.

The mechanical strength of the ceramic composite is shown in Table 17, where the three point bending strength was measured at 1850° C. in argon. The ceramic composite was kept at 1700° C. for 50 hours and the increase in weight was 0.003 g/cm$^3$.

TABLE 17

|  | Example 13 | Example 14 | Example 15 |
|---|---|---|---|
| Three point bending strength (MPa) | 400 | 450 | 550 |

In the same manner as above, starting powders of other metal oxides were prepared and unidirectionally solidified. The constituent phases and the results of X ray diffraction of the solidified bodies are shown in Table 18. It was found that the solidified bodies were ceramic composites having a uniform structure without any colonies or grain boundary phases.

Comparative Example 5

The procedures of Example 15 were repeated except that the pressure in the chamber was changed to normal pressure (atmospheric pressure).

Figure 21:
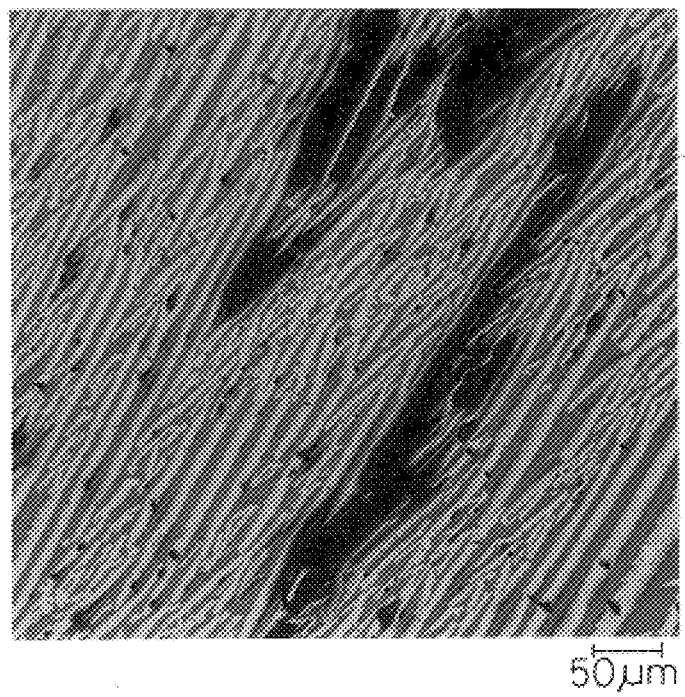
FIG. 21 is a scanning electron microphotograph showing a ceramic composite obtained in Comparative Example 5.

FIG. 21 shows scanning electron micrograph of the thus obtained solidified body consisting of $\alpha$-$Al_2O_3$ and $3Al_2O_3 \cdot 2SiO_2$ in a section cut perpendicular to the direction of the solidification. It was demonstrated that the ceramic composite of the solidified body included colonies and grain boundary phases as well as pores.

Further, in X-ray diffraction patterns of the ceramic composite obtained from the plane perpendicular to the direction of the solidification, diffraction peaks from a plurality of planes of $\alpha$-$Al_2O_3$ and diffraction peaks from a plurality of planes of $3Al_2O_3 \cdot 2SiO_2$ were observed, demonstrating that the solidified body was a ceramic composite consisting of an $\alpha$-$Al_2O_3$ polycrystal phase and a $3Al_2O_3 \cdot 2SiO_2$ polycrystal phase.

In the same manner as above, starting powders of other metal oxides were prepared and unidirectionally solidified. It was found that the solidified bodies included colonies and grain boundary phases as well as pores.

TABLE 18

| Starting powders and their proportions (mole %) | | Phases constituting ceramic composite | Results of X ray diffraction |
|---|---|---|---|
| xA | yB | | |
| 68% $Al_2O_3$ | 32% $SiO_2$ | $\alpha$-$Al_2O_3$ | polycrystal |
| | | $3Al_2O_3 \cdot 2SiO_2$ | polycrystal |
| 60% $Y_2O_3$ | 40% $Al_2O_3$ | $2Y_2O_3 \cdot Al_2O_3$ | polycrystal |
| | | $3Y_2O_3 \cdot 5Al_2O_3$ | polycrystal |
| 78% NiO | 22% $Y_2O_3$ | NiO | polycrystal |
| | | $Y_2O_3$ | polycrystal |
| 80% $TiO_2$ | 20% $Al_2O_3$ | $\alpha$-$Al_2O_3$ | polycrystal |
| | | $TiO_2$ | polycrystal |

Example 16

$\alpha$-$Al_2O_3$ powder and $ZrO_2$ powder in a molar ratio of 50.4% by mole of the former to 49.6% by mole of the latter were milled in a wet mill using ethanol. The obtained slurry was dried in a rotary evaporator to remove the ethanol.

The obtained mixed powder of $\alpha$-$Al_2O_3$ and $ZrO_2$ was charged in a molybdenum crucible in a chamber, in which the atmospheric pressure was maintained at $10^{-5}$ Torr and the crucible was heated by an induction coil to 1950 to 2100° C. to melt the mixed powder in the crucible. Subsequently, unidirectional solidification was conducted by lowering the crucible at a speed of 5 mm/hour under the above atmospheric pressure to obtain a unidirectionally solidified body.

Figure 22:
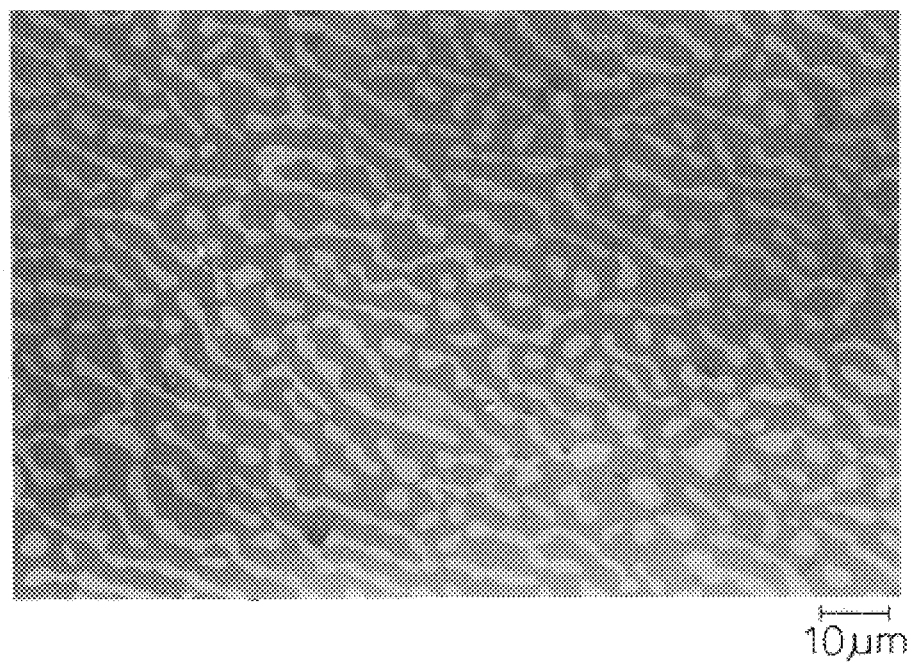
FIG. 22 is a scanning electron microphotograph showing a ceramic composite obtained in Example 16.

FIG. 22 shows scanning electron micrograph of the thus obtained solidified body in a section cut perpendicular to the direction of the solidification. In the photograph, the white portions are a $ZrO_2$ phase and the black portions are an $\alpha$-$Al_2O_3$ phase.

It was demonstrated that the ceramic composite of the solidified body does not include any colonies or grain boundary phases, that pores or voids do not exist, and that a uniform structure is obtained.

Further, in X-ray diffraction patterns of the ceramic composite obtained from the plane perpendicular to the direction of the solidification, only a diffraction peak from a specific plane of $\alpha$-$Al_2O_3$ and a diffraction peak from a specific plane of $ZrO_2$ were observed, demonstrating that the solidified body was a ceramic composite consisting of an $\alpha$-$Al_2O_3$ single crystal phase and a $ZrO_2$ single crystal phase.

The mechanical strength of the ceramic composite is shown in Table 19, where the three point bending strength was measured at 1600° C. in argon. The ceramic composite was kept at 1700° C. for 50 hours and the increase in weight was 0.003 g/cm³. Further, the fracture toughness of the ceramic composite was measured, at room temperature and by the IF method, to be a high value of 10 MPa$\sqrt{m}$

TABLE 19

|  | Example 16 |
|---|---|
| Three point bending strength (MPa) | 700 |

We claim:

1. A ceramic composite of a solidified, unidirectional, fused body consisting of aluminum oxide and a composite oxide of aluminum oxide and a rare earth oxide other than yttrium oxide, said body being free of colonies and pores, and also free of boundary phases which are comprised of a composition other than the aluminum oxide and composite oxide.

2. A ceramic composite of a solidified, unidirectional, fused body consisting of at least two crystal phases of oxides, said body being free of colonies and pores, and also free of boundary phases which are comprised of a composition other than the oxides of the at least two crystal phases, said oxides of the crystal phases being selected from the group consisting of aluminum oxide, rare earth oxides and complex oxides of aluminum oxide with rare earth oxide which are free of a combination of (a) aluminum oxide, $Al_2O_3$ and (b) a complex oxide of aluminum oxide, $Al_2O_3$ and yttrium oxide, $Y_2O_3$.

* * * * *